(12) United States Patent
Sato

(10) Patent No.: US 9,317,174 B2
(45) Date of Patent: Apr. 19, 2016

(54) MOVING AN OBJECT IN A VIRTUAL SPACE BASED ON MOTION DETECTING SIGNALS

(75) Inventor: Kenta Sato, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 999 days.

(21) Appl. No.: 12/510,378

(22) Filed: Jul. 28, 2009

(65) Prior Publication Data

US 2010/0265249 A1  Oct. 21, 2010

(30) Foreign Application Priority Data

Apr. 16, 2009  (JP) ................................. 2009-100244

(51) Int. Cl.
| G06T 15/00 | (2011.01) |
| G06T 13/00 | (2011.01) |
| A63F 9/24 | (2006.01) |
| G06F 3/0481 | (2013.01) |
| A63F 13/20 | (2014.01) |
| G06F 3/0346 | (2013.01) |

(52) U.S. Cl.
CPC ............ G06F 3/04815 (2013.01); A63F 13/06 (2013.01); G06F 3/0346 (2013.01); A63F 2300/105 (2013.01); A63F 2300/6045 (2013.01); A63F 2300/6054 (2013.01); A63F 2300/646 (2013.01)

(58) Field of Classification Search
CPC ......... G06T 19/00; G06T 17/20; G06T 17/00; A63F 13/06; A63F 13/10; A63F 2300/105; A63F 2300/6054; A63F 2300/6045; A63F 2300/646; G06F 3/0346; G06F 3/04815

USPC ............ 463/31–32, 37–38, 43; 345/419, 619, 345/474
See application file for complete search history.

(56) References Cited

U.S. PATENT DOCUMENTS

| 2006/0281546 | A1 | 12/2006 | Iwamoto et al. | |
| 2007/0213109 | A1* | 9/2007 | Sato et al. | ......................... 463/3 |
| 2007/0213127 | A1* | 9/2007 | Sato | ............................... 463/36 |

(Continued)

FOREIGN PATENT DOCUMENTS

| JP | 2000-308756 | 11/2000 |
| JP | 2006-331109 A | 7/2006 |
| JP | 2007-295990 A | 11/2007 |

OTHER PUBLICATIONS

Machine translation of Japanese Patent Publication No. 2000-308756 published Jul. 11, 2000 (9 pages).

*Primary Examiner* — Jin-Cheng Wang
(74) *Attorney, Agent, or Firm* — Nixon & Vanderhye P.C.

(57) ABSTRACT

First, a moving direction of an input device is calculated based on motion information obtained from predetermined detection means for detecting attitude or motion of the input device operated by a user. Then, the object in a virtual three-dimensional space is caused to move to a position which is obtained by hypothetically moving a position of the object based on the direction in which the input device has been moved and then by correcting the position of the object hypothetically moved, only in a direction perpendicular or substantially perpendicular to the direction in which the input device has been moved.

17 Claims, 13 Drawing Sheets

(56) References Cited

U.S. PATENT DOCUMENTS

| | | |
|---|---|---|
| 2007/0254738 A1 | 11/2007 | Sato |
| 2008/0119269 A1* | 5/2008 | Nonaka et al. .................. 463/32 |
| 2008/0132338 A1* | 6/2008 | Yoshida .......................... 463/43 |
| 2008/0242385 A1* | 10/2008 | Miyamoto ........................ 463/1 |
| 2009/0005166 A1* | 1/2009 | Sato ................................. 463/37 |
| 2009/0017907 A1* | 1/2009 | Shimizu .......................... 463/31 |
| 2010/0144447 A1* | 6/2010 | Nonaka et al. .................. 463/43 |
| 2010/0323783 A1 | 12/2010 | Nonaka et al. |

* cited by examiner

F I G. 1
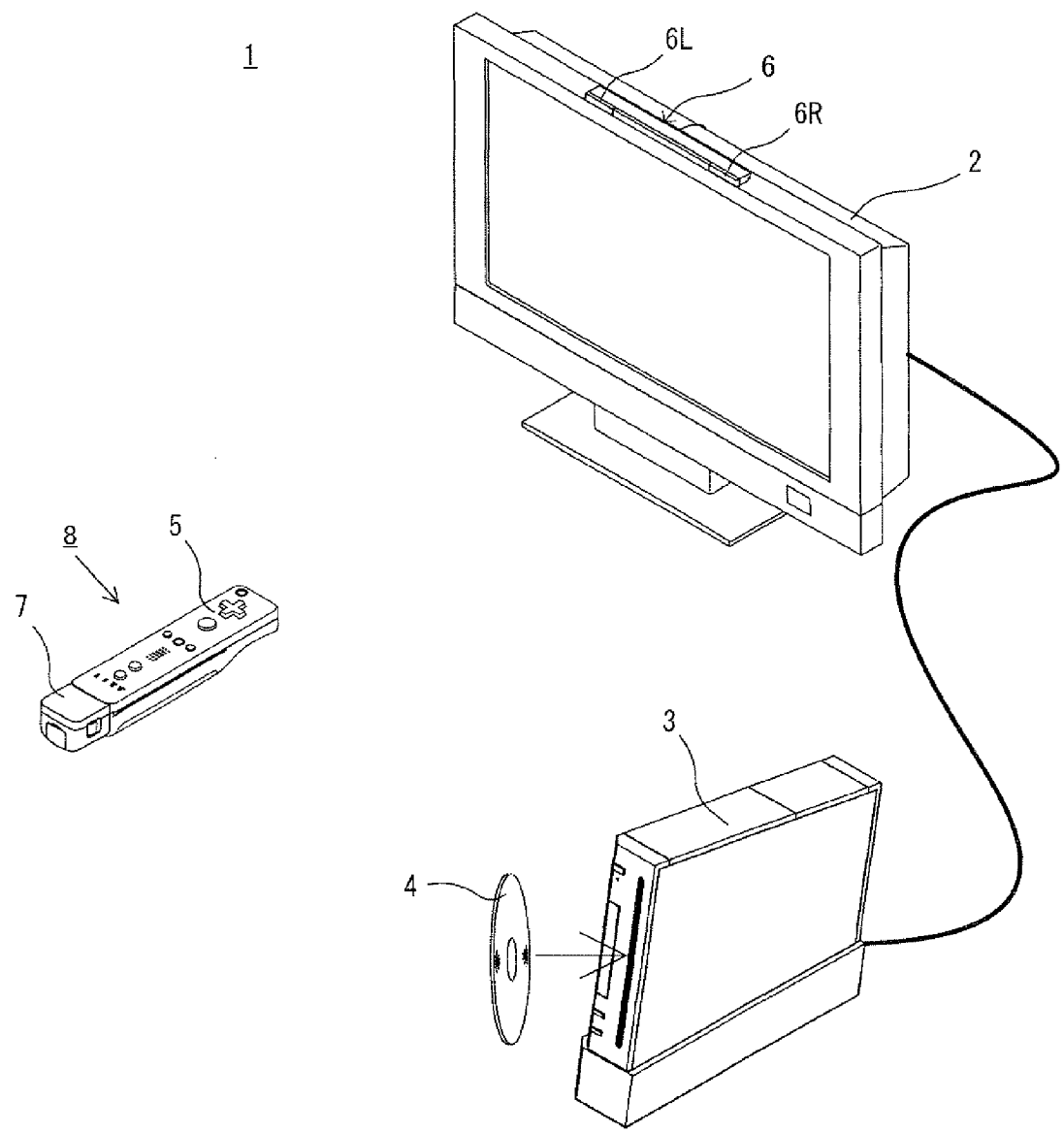

F I G. 1 8
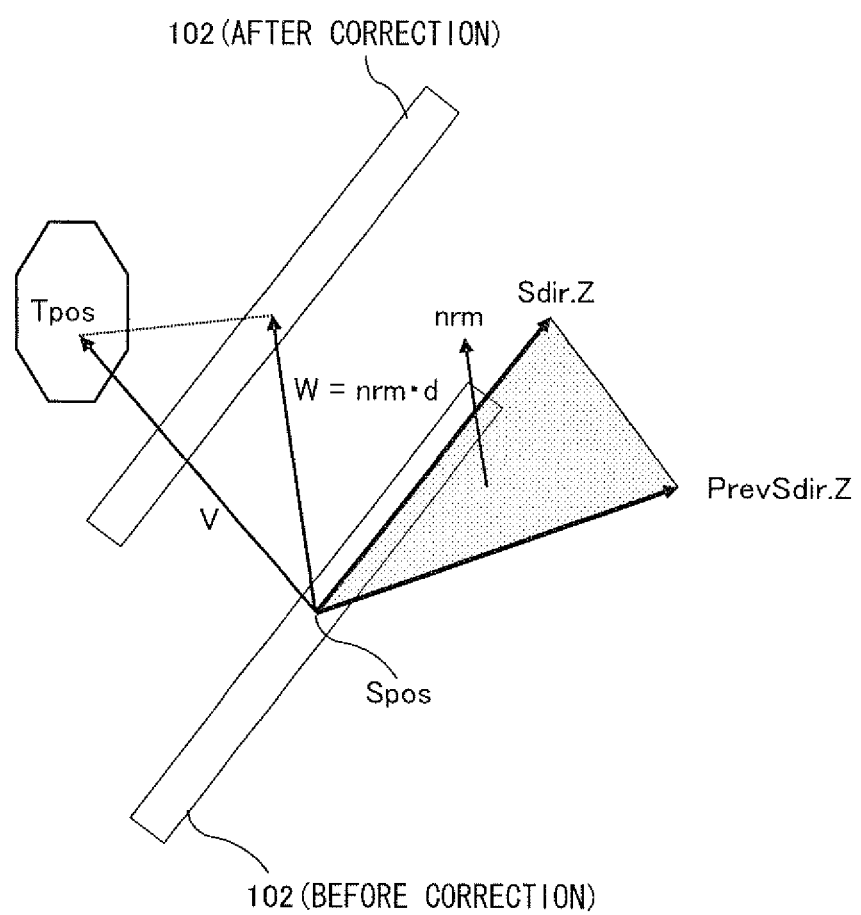

MOVING AN OBJECT IN A VIRTUAL SPACE BASED ON MOTION DETECTING SIGNALS

CROSS REFERENCE TO RELATED APPLICATION

The disclosure of Japanese Patent Application No. 2009-100244, filed on Apr. 16, 2009, is incorporated herein by reference.

BACKGROUND OF THE INVENTION

1. Field of the Invention

The present invention relates to a computer-readable storage medium storing an information processing program and an information processing apparatus which are capable of causing an object in a virtual three-dimensional space to move, and more particularly, to a computer-readable storage medium storing an information processing program and an information processing apparatus which are capable of causing an object in a virtual three-dimensional space to move, based on a motion detection signal outputted from an input device including a motion detection sensor for detecting a motion thereof.

2. Description of the Background Art

Conventionally, a game apparatus using an input device including an acceleration sensor and/or a gyro-sensor is known for example, Japanese Laid-Open Patent Publication No. 2000-308756). In the game apparatus, an action, such as swinging a sword, performed by a player who moves a rod-like input device as if it were a sword is detected by using an acceleration sensor and/or a gyro-sensor, so as to be reflected in an action of a character holding a sword in the game.

However, the game apparatus as described above has the following problems. That is, in the game apparatus described above, the action of swinging the sword detected by the acceleration sensor and/or the gyro-sensor is not recognized as an action of swinging the sword performed in a direction intended by the player. For example, when the player has performed a cutting action with the sword onto a predetermined object, there may be a case where the actual action performed in the game fails to achieve the intended action of cutting the predetermined object. Thus, a difficulty level of the game is increased, which lowers the motivation of the user.

SUMMARY OF THE INVENTION

Therefore, an object of the present invention is to provide a game apparatus which realizes an appropriate difficulty level of a game which is performed using an input device including an acceleration sensor and/or an angular velocity sensor.

The present invention has the following features to attain the object mentioned above. The reference numerals, supplementary descriptions and the like in the parentheses in the following description indicate an exemplary correspondence with the embodiment described below in order to aid in understanding the present invention and are not intended to limit, in any way, the scope of the present invention.

A first aspect of the present invention is directed to a computer-readable storage medium storing an information processing program to be executed by a computer of an information processing apparatus for performing information processing for causing an object in a virtual three-dimensional space to move, based on motion information obtained from predetermined detection means for detecting an attitude or a motion of an input device operated by a user, in which the computer is caused to function as moving direction calculation means (S4) and object moving means (S7). The moving direction calculation means calculates, based on the motion information, moving direction data representing a direction in which the input device has been moved. The object moving means causes the object to move to a position which is obtained by hypothetically moving a position of the object based on the moving direction data and then by correcting the position of the object hypothetically moved, only in a direction perpendicular or substantially perpendicular to the direction in which the input device has been moved.

According to the first aspect of the present invention, with regard to the movement of the object, it is possible to prevent the player from noticing the correction being performed.

In a second aspect based on the first aspect, the predetermined detection means is a predetermined motion sensor included in the input device.

According to the second aspect of the present invention, the attitude or the motion of the input device can be more precisely detected.

In a third aspect based on the first aspect, the object moving means causes the object to move such that the object is brought to or brought close to a predetermined targeted position.

According to the third aspect of the present invention, the difficulty level of the game can be adjusted without the player noticing the correction of the movement of the object being performed noticed.

In a fourth aspect based on the first aspect, the information processing program further causes the computer to function as input attitude calculation means (S3) for repeatedly calculating, based on the motion information, input attitudes representing the attitude of the input device. Then, the object moving means causes the object to move to a position which is obtained by correcting the position of the object hypothetically moved, only in a direction perpendicular or substantially perpendicular to the direction in which the input device has been moved, the direction being defined based on the input attitudes repeatedly calculated by the input attitude calculation means.

In a fifth aspect based on the fourth aspect, the object moving means causes the object to move to a position which is obtained by correcting the position of the object hypothetically moved, only in a direction perpendicular or substantially perpendicular to a plane which is defined based on a change of the input attitudes repeatedly calculated by the input attitude calculation means.

According to the fourth and the fifth aspects of the present invention, it is possible to prevent the player from noticing the correction being performed.

In a sixth aspect based on the fourth aspect, the object moving means causes the object to move to a position which is obtained by correcting the position of the object hypothetically moved, only in a direction defined by a vector product of vectors of two predetermined input attitudes among the input attitudes repeatedly calculated by the input attitude calculation means.

According to the sixth aspect of the present invention, the correction direction can be calculated without increasing the processing load for the information processing apparatus.

In a seventh aspect based on the sixth aspect, the two predetermined input attitudes among the input attitudes repeatedly calculated by the input attitude calculation means are input attitudes calculated in succession.

According to the seventh aspect of the present invention, a more appropriate correction direction can be calculated so as to further prevent the player from noticing the correction being performed.

In an eighth aspect based on the first aspect, the information processing program further causes the computer to function as motion determination means for determining whether or not a magnitude of a motion of the input device is larger than a predetermined value. The object moving means performs correction when the motion determination means determines that the magnitude of the motion of the input device is larger than the predetermined value.

According to the eighth aspect of the present invention, correction less likely to be noticed by the player can be performed.

In a ninth aspect based on the first aspect, the object moving means includes correction direction calculation means (S6) for calculating correction direction data representing a direction perpendicular or substantially perpendicular to the direction in which the input device has been moved. The object moving means increases a magnitude of correction to be performed in a direction represented by the correction direction data in accordance with an increase in the magnitude of the motion of the input device.

In a tenth aspect based on the eighth aspect, the object moving means includes correction direction calculation means (S6) for calculating correction direction data representing a direction perpendicular or substantially perpendicular to the direction in which the input device has been moved. The object moving means increases a magnitude of the correction to be performed in a direction represented by the correction direction data in accordance with an increase in the magnitude of the motion of the input device.

According to the ninth and the tenth aspects of the present invention, correction in accordance with the operation of the player is performed. Accordingly the correction less likely to be noticed by the player can be performed, without giving the player unnatural feelings.

In a eleventh aspect based on the first aspect, the object moving means includes correction direction calculation means (S6) for calculating correction direction data representing a direction perpendicular or substantially perpendicular to the direction in which the input device has been moved, and causes the object to move to the position which is obtained by hypothetically moving the position of the object based on the moving direction data and then by correcting the position of the object hypothetically moved, only in the direction represented by the correction direction data.

According to the eleventh aspect of the present invention, the same advantage as that in the first aspect of the present invention can be obtained.

In a twelfth aspect based on the first aspect, the motion sensor is an angular velocity sensor. The motion information is information containing an angular velocity detected by the angular velocity sensor.

According to the twelfth aspect of the present invention, more precise and simpler calculation of a change of the attitude of the input device can be realized, thereby enabling more appropriate correction.

In a thirteenth aspect of the present invention, an information processing apparatus for performing information processing for causing an object in a virtual three-dimensional space to move, based on motion information obtained from predetermined detection means for detecting an attitude or a motion of an input device operated by a user includes moving direction calculation means (10) and object moving means (10). The moving direction calculation means calculates, based on the motion information, a moving direction representing a direction in which the input device has been moved. The object moving means causes the object to move to a position which is obtained by hypothetically moving a position of the object based on the moving direction and then by correcting the position of the object hypothetically moved, only in a direction perpendicular or substantially perpendicular to the direction in which the input device has been moved.

According to the thirteenth aspect of the present invention, the same advantage as that in the first aspect of the present invention can be obtained.

Therefore, according to the present invention, the difficulty level of the game can be adjusted without the correction of the movement of the object being performed noticed by the player, whereby the entertaining feature of the game is increased.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an external view illustrating a game system 1;

FIG. 18 is a diagram conceptually illustrating a movement of a sword object and correction thereof according to the second embodiment.

DESCRIPTION OF THE PREFERRED EMBODIMENTS

Figure 2:
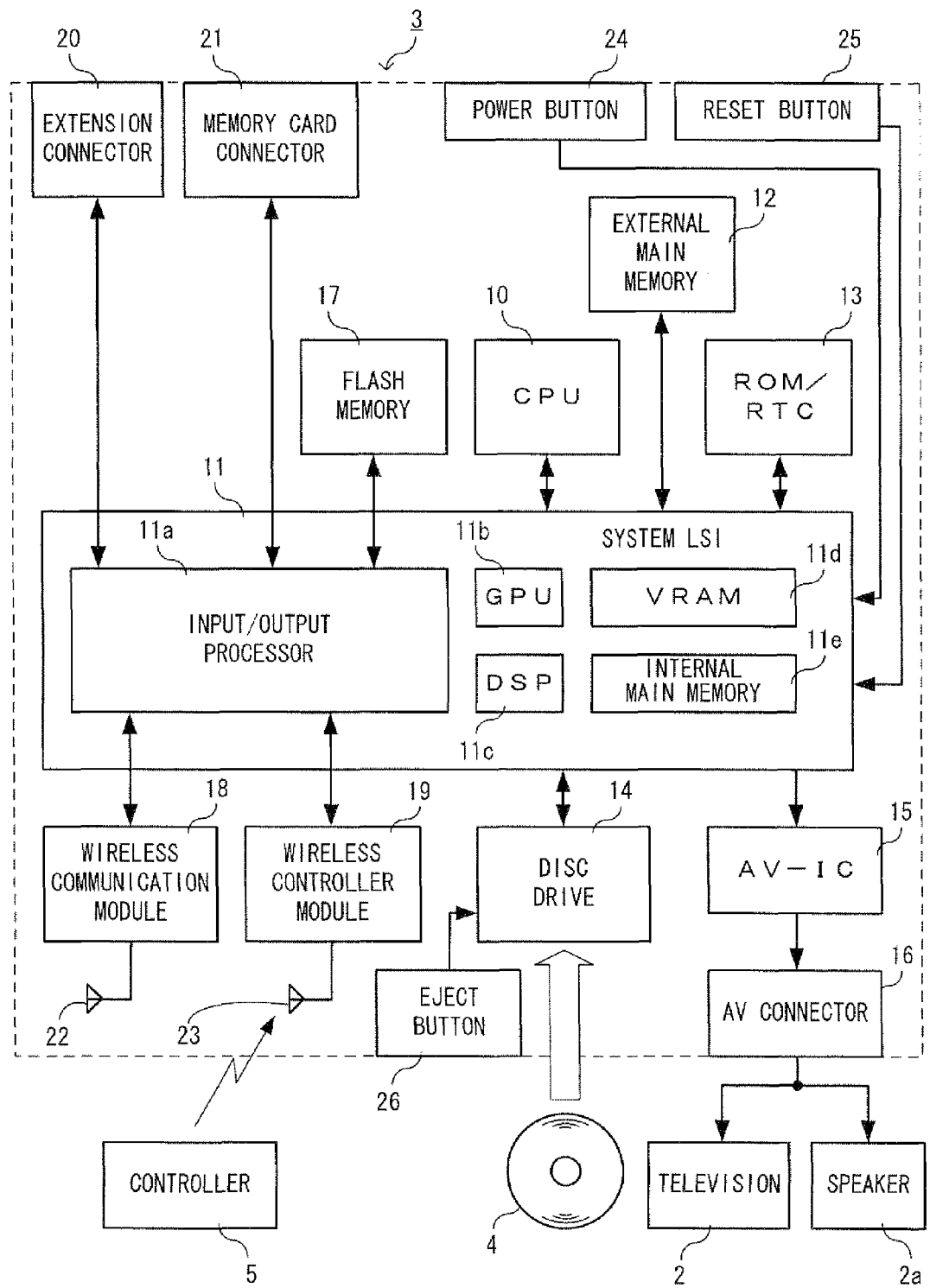
FIG. 2 is a block diagram illustrating a structure of a game apparatus 3.

Hereinafter, embodiments of the present invention will be described with reference to the drawings. Note that the present invention is not limited to the embodiments.

First, prior to the description of the details of the embodiments, the structure of a game system commonly used in the embodiments will be described.

(Overall Configuration of Game System)

With reference to FIG. 1, a game system 1 including a game apparatus according to the embodiment of the present invention will be described. FIG. 1 is an external view illustrating a game system 1. Hereinafter, a game apparatus and a game program according to the embodiments will be described by using a stationary game apparatus as an example. As shown in FIG. 1, the game system 1 includes a television receiver (hereinafter, referred to simply as a "television") 2, a game apparatus 3, an optical disc 4, an input device 8, and a marker section 6. In the present system, a game process is executed on the game apparatus 3 in accordance with a game operation using the input device 8.

Into the game apparatus 3, the optical disc 4, which typifies an information storage medium and is exchangeable with respect to the game apparatus 3, is detachably inserted. In the optical disc 4, the game program executed on the game apparatus 3 is stored. The game apparatus 3 has, on the front surface thereof, an opening through which the optical disc 4 is inserted. The game processing is executed on the game apparatus 3 by reading and executing the game program stored in the optical disc 4 which is inserted in the game apparatus 3 through the opening.

The game apparatus 3 is connected via a connection cord to the television 2 typifying a display device. The television 2 displays a game image generated through the game processing executed on the game apparatus 3. Further, the marker section 6 is provided in the vicinity of the screen of the television 2 (on the top surface of the screen of the television 2 shown in FIG. 1). The marker section 6 includes two markers, a marker 6R and a marker 6L, at both ends thereof. Specifically, each of the markers 6R and 6L includes at least one infrared LED, and outputs an infrared light forward from the television 2. The marker section 6 is connected to the game apparatus 3, and the game apparatus 3 is capable of controlling each infrared LED included in the marker section 6 so as to be lit up.

The input device 8 supplies, to the game apparatus 3, operation data representing a content of an operation performed thereon. In the present embodiment, the input device 8 includes a controller 5 and a gyro-sensor unit 7. In the input device 8, the gyro-sensor unit 7 is detachably connected to the controller 5, the details of which will be described below. The controller 5 is connected to the game apparatus 3 by wireless communication. In the present embodiments, for example, the Bluetooth (registered trademark) technology is used for the wireless communication between the controller 5 and the game apparatus 3. In another embodiment, the controller 5 and the game apparatus 3 may communicate with each other by a wired connection.

(Internal Structure of Game Apparatus 3)

Next, with reference to FIG. 2, an internal structure of the game apparatus 3 will be described. FIG. 2 is a block diagram illustrating a structure of the game apparatus 3. The game apparatus 3 includes a CPU 10, a system LSI 11, an external main memory 12, a ROM/RTC 13, a disc drive 14, an AV-IC 15, and the like.

The CPU 10, serving as a game processor, executes the game program stored in the optical disc 4 so as to perform the game processing. The CPU 10 is connected to the system LSI 11. In addition to the CPU 10, the external main memory 12, the ROM/RTC 13, the disc drive 14, and the AV-IC 15 are also connected to the system LSI 11. The system LSI 11 performs processing such as control of data transmission between respective components connected thereto, generation of an image to be displayed, and acquisition of data from an external apparatus. An internal structure of the system LSI 11 will be described below. The external main memory 12, which is of a volatile type, stores programs, such as a game program read from the optical disc 4 or a flash memory 17, and various data, and is used as a work area and a buffer area for the CPU 10. The ROM/RTC 13 includes a ROM (so-called boot ROM) incorporating a program for booting the game apparatus 3, and a clock circuit (RTC: real time clock) for counting time. The disc drive 14 reads, from the optical disc 4, program data, texture data and the like, and writes the read data into an internal main memory 11e described below or the external main memory 12.

Provided in the system LSI 11 are an input/output processor (I/O processor) 11a, a GPU (Graphics Processor Unit) 11b, a DSP (Digital Signal Processor) 11c, a VRAM 11d, and the internal main memory 11e. These components 11a toile are connected to each other via an internal bus which is not shown.

The GPU 11b, which is a part of rendering means, generates an image in accordance with a graphics command (draw command) from the CPU 10. The VRAM 11d stores thereon data (such as polygon data and texture data) necessary for the GPU 11b to execute the graphics command. When an image is to be generated, the CPU 11b generates image data by using the data stored in the VRAM 11d.

The DSP 11c functions as an audio processor, and generates audio data by using sound data and sound waveform (tone quality) data stored in the internal main memory 11e or the external main memory 12.

The image data and the audio data generated as described above are read by the AV-IC 15. The AV-IC 15 outputs the read image data to the television 2 via an AV connector 16, and also outputs the read audio data to a speaker 2a of the television 2. Thus, an image is displayed on the television 2, and a sound is outputted from the speaker 2a.

The input/output processor 11a executes data reception and transmission between the components connected thereto and download of data from an external apparatus. The input/output processor 11a is connected to the flash memory 17, a wireless communication module 18, a wireless controller module 19, an extension connector 20, and a memory card connector 21. To the wireless communication module 18, an antenna 22 is connected, and to the wireless controller module 19, an antenna 23 is connected.

The input/output processor 11a may be connected to a network via the wireless communication module 18 and the antenna 22 so as to communicate with another game apparatus or various servers connected to the network. The input/output processor 11a accesses the flash memory 17 at regular time intervals so as to detect presence or absence of data which is required to be transmitted to the network. When such data is present, the data is transmitted to the network via the wireless communication module 18 and the antenna 22. Further, the input/output processor 11a receives, via the network, the antenna 22 and the wireless communication module 18, data transmitted from another game apparatus or data downloaded from a download server, and stores the received data in the flash memory 17. The CPU 10 executes the game program to read the data stored in the flash memory 17, thereby using the read data on the game program. The flash memory 17 may store not only the data transmitted and received between the game apparatus 3 and another game apparatus or various servers, but also saved data (result data or intermediate step data of the game) of a game played with the game apparatus 3.

Further, the input/output processor 11a receives the operation data transmitted from the controller 5, via the antenna 23 and the wireless controller module 19, and (temporarily) stores the operation data in a buffer area of the internal main memory 11e or the external main memory 12.

Further, the extension connector 20 and the memory card connector 21 are connected to the input/output processor 11a. The extension connector 20 is an interface connector as typified by a USB and an SCSI, and is capable of performing communication with the network, instead of the wireless communication module 18, by connecting thereto a medium such as an external storage medium, a peripheral device such as another controller, or a wired communication connector. The memory card connector 21 is a connector for connecting thereto the external storage medium such as a memory card. For example, the input/output processor 11a accesses the external storage medium via the extension connector 20 or the memory card connector 21, so as to store data in the external storage medium or to read data from the external storage medium.

The game apparatus 3 includes a power button 24, a reset button 25, and an eject button 26. The power button 24 and the reset button 25 are connected to the system LSI 11. When the power button 24 is pressed so as to be ON, the power is supplied to the respective components of the game apparatus 3 via an AC adapter which is not shown. When the reset button 25 is pressed, the system LSI 11 restarts a boot program of the game apparatus 3. The eject button 26 is connected to the disc drive 14. When the eject button 26 is pressed, the optical disc 4 is ejected from the disc drive 14.

[Structure of the Input Device 8]

Figure 3:
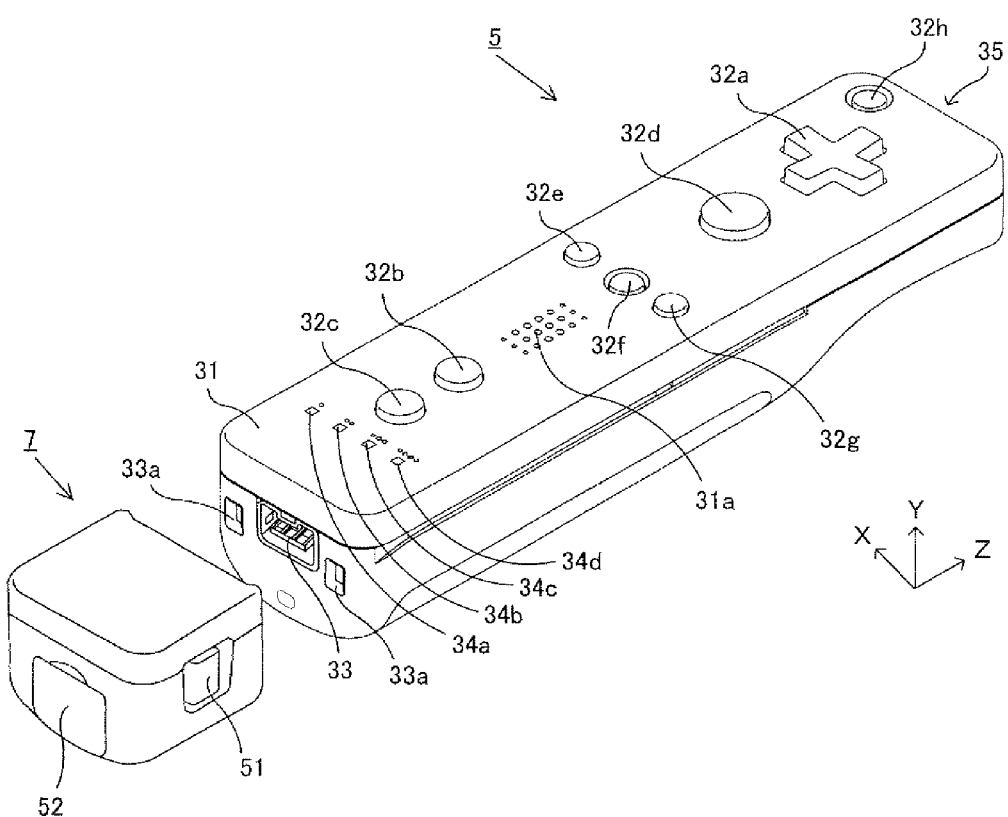
FIG. 3 is a perspective view illustrating an external appearance of an input device 8.
Figure 4:
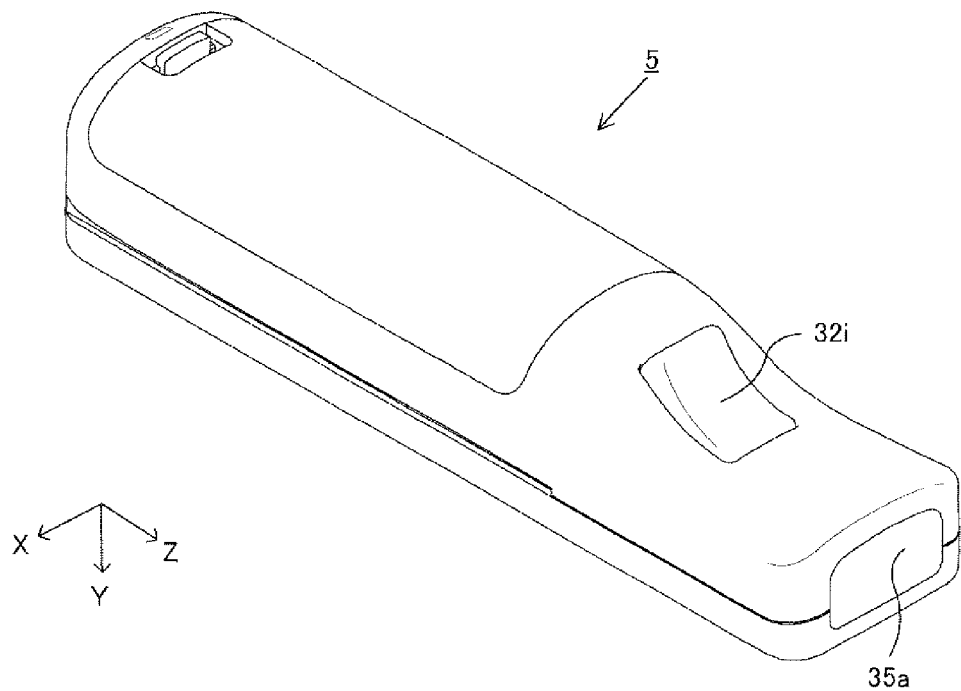
FIG. 4 is a perspective view illustrating an external appearance of a controller 5.

Next, the input device 8 is described with reference to FIG. 3 to FIG. 6. FIG. 3 is a perspective view illustrating an external appearance of the input device 8. FIG. 4 is a perspective view illustrating an external appearance of the controller 5. FIG. 3 is a perspective view as viewed from the top rear side of the controller 5. FIG. 4 is a perspective view of the controller 5 as viewed from the bottom front side thereof.

In FIG. 3 and FIG. 4, the controller 5 has a housing 31 formed through, for example, plastic molding. The housing 31 has a generally parallelepiped shape extending in a longitudinal direction from front to rear (the direction of Z-axis shown in FIG. 3). The overall size of the housing 31 is small enough to be held by one hand of an adult or even a child. The player can play the game by pressing the buttons provided on the controller 5, and by moving the controller 5 in such a manner as to change the position and the attitude thereof.

The housing 31 is provided with a plurality of operation buttons. As shown in FIG. 3, on the top surface of the housing 31, a cross button 32a, a No. 1 button 32b, a No. 2 button 32c, an A button 32d, a minus button 32e, a home button 32f, a plus button 32g, and a power button 32h are provided. The top surface of the housing 31 on which the buttons 32a to 32h are provided is also referred to as a "button side" herein. On the other hand, as shown in FIG. 4, on the bottom surface of the housing 31, a recessed portion is formed, and on a slope surface of the recessed portion on the rear bottom surface thereof a B button 32i is provided. Various functions are assigned to the operation buttons 32a to 32i, respectively, in accordance with the game program executed by the game apparatus 3. The power button 32h is for turning on and off the power to the game apparatus 3 by remote control. The home button 32f and the power button 32h each have a top surface thereof buried in the top surface of the housing 31. This prevents the player from inadvertently pressing the home button 32f or the power button 32h.

On the rear surface of the housing 31, a connector 33 is provided. The connector 33 is used for connecting another apparatus (for example, the gyro-sensor unit 7 or another controller) to the controller 5. On both sides of the connector 33 at the rear surface of the housing 31, latch holes 33a are provided so as to prevent another apparatus mentioned above from being easily dismounted therefrom.

In the rear portion of the top surface of the housing 31, a plurality (four in FIG. 3) of LEDs 34a to 34d are provided. Here, a controller type (number) is assigned to the controller 5 such that the controller 5 is distinguishable from other main controllers. For example, the LEDs 34a to 34d are used for informing the player of the controller type which is currently set for controller 5, or of remaining battery capacity of the controller 5, or the like. Specifically, when a game is played using the controller 5, one of the plurality of LEDs 34a to 34d is lit up, in accordance with the controller type.

Moreover, the controller 5 includes an imaging information calculation section 35 (FIG. 6), and as shown in FIG. 4, a light entrance surface 35a for the imaging information calculation section 35 is provided on the front surface of the housing 31. The light entrance surface 35a is made of a material which allows an infrared light emitted from the markers 6R and 6L to pass therethrough at least.

A sound hole 31a for outputting a sound from a speaker 49 (FIG. 5) of the controller 5 is formed between the No. 1 button 32b and the home button 32f on the top surface of the housing 31.

Figure 5:
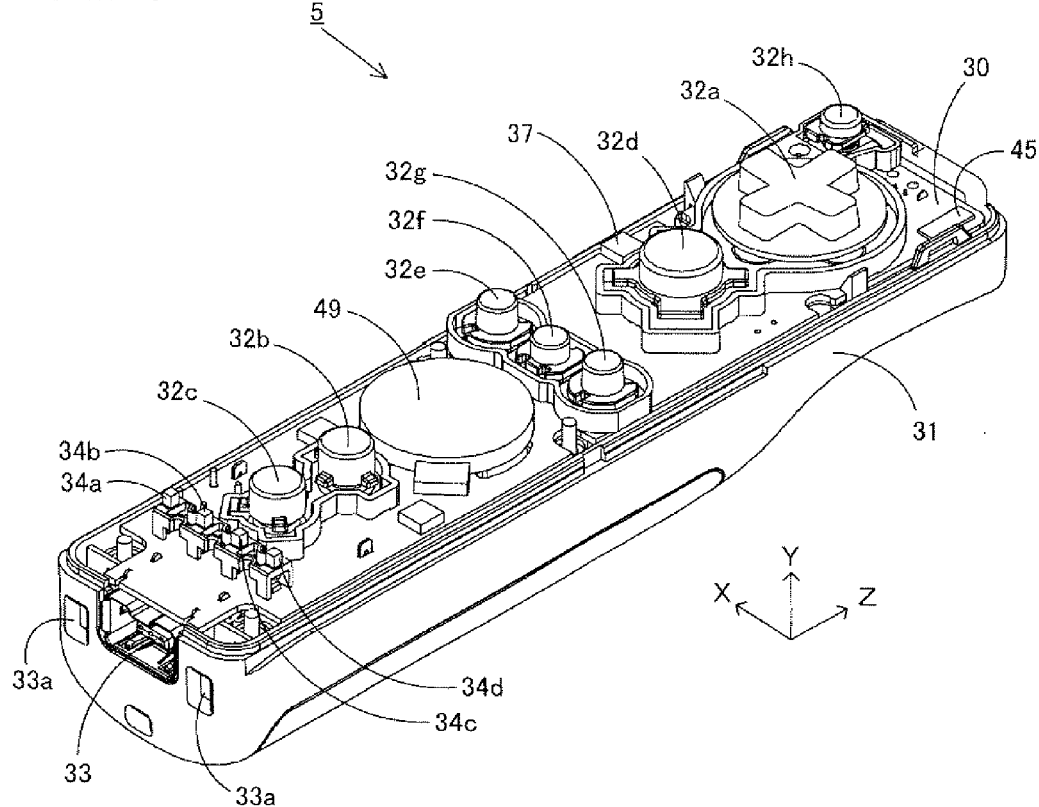
FIG. 5 is a diagram illustrating an internal structure of the controller 5.
Figure 6:
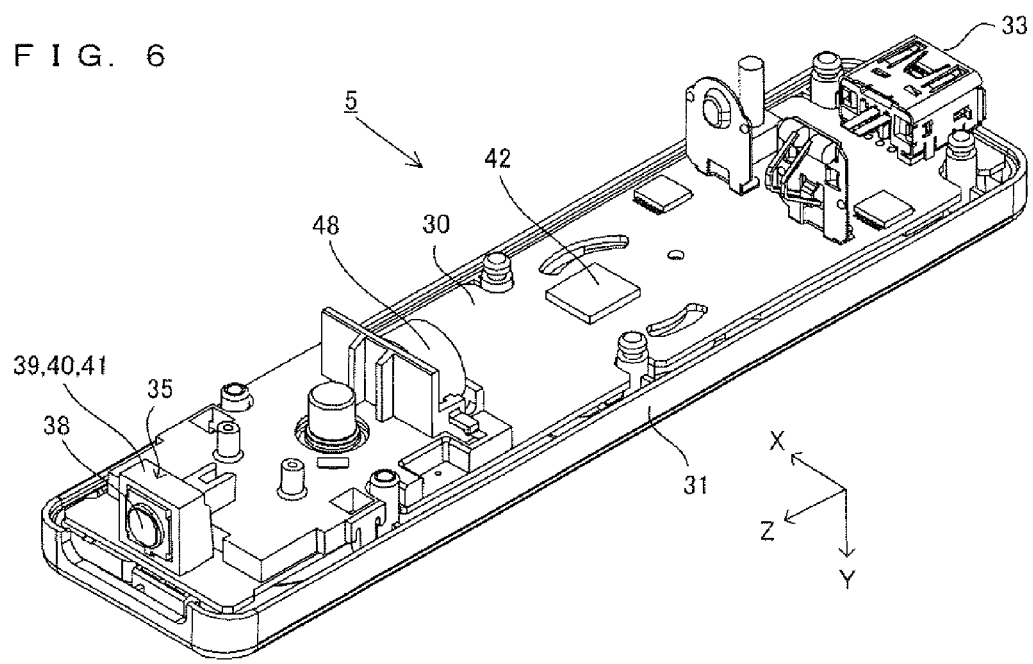
FIG. 6 is a diagram illustrating an internal structure of the controller 5.

With reference to FIGS. 5 and 6, an internal structure of the controller 5 will be described. FIG. 5 and FIG. 6 are diagrams illustrating an internal structure of the controller 5. FIG. 5 is a perspective view illustrating a state where an upper housing (a part of the housing 31) of the controller 5 is removed. FIG. 6 is a perspective view illustrating a state where a lower housing (a part of the housing 31) of the controller 5 is removed. FIG. 6 is a perspective view illustrating a reverse side of a substrate 30 shown in FIG. 5.

As shown in FIG. 5, the substrate 30 is fixed inside the housing 31. On the top main surface of the substrate 30, the operation buttons 32a to 32h, LEDs 34a to 34d, an acceleration sensor 37, an antenna 45, a speaker 49, and the like are provided. These components are connected to a microcomputer 42 (see FIG. 6) via lines (not shown) provided on the substrate 30 and the like. In the present embodiment, the acceleration sensor 37 is located in a position shifted from the center of the controller 5 in an X-axis direction. This allows easier calculation of a motion of the controller 5 while the controller 5 being rotated about a 5-axis. The acceleration sensor 37 is located in a position shifted toward the front of the controller 5 from the center thereof in a longitudinal direction (Z-axis direction). The controller 5 functions as a wireless controller by using a wireless module 44 (FIG. 6) and the antenna 45.

As shown in FIG. 6, at the front edge of the bottom main surface of the substrate 30, the imaging information calculation section 35 is provided. The imaging information calculation section 35 includes an infrared filer 38, a lens 39, an image pickup element 40, and an image processing circuit 41 located in order, from the front surface of the controller 5. These components 38 to 41 are fixed to the bottom main surface of the substrate 30, respectively.

On the bottom main surface of the substrate 30, the microcomputer 42 and a vibrator 48 are provided. The vibrator 48 is, for example, a vibrating motor or a solenoid, and is connected to the microcomputer 42 via lines provided in the substrate 30 and the like. An instruction from the microcomputer 42 actuates the vibrator 48, to cause the controller 5 to vibrate. The vibration is conveyed to the player's hand holding the controller 5. Thus, a so-called vibration-feedback game is realized. In the present embodiment, the vibrator 48 is located in a position slightly forward from the longitudinal center of the housing 31. That is, the vibrator 48 is located in a position shifted from the center of the controller 5, toward the end thereof. Thus, the vibration of the vibrator 48 allows the controller 5 to vibrate to a large extent. The connector 33 is fixed at the rear edge of the bottom main surface of the substrate 30. In addition to the components shown in FIG. 5 and FIG. 6, the controller 5 includes a crystal oscillator for generating a reference clock of the microcomputer 42, an amplifier for outputting an audio signal to the speaker 49, and the like.

The gyro-sensor unit 7 includes gyro-sensors (gyro-sensors 55 and 56 shown in FIG. 7) for detecting angular velocities about three axes. The gyro-sensor unit 7 is detachably mounted to the connector 33 of the controller 5. A plug (plug 53 shown in FIG. 7) which is connectable to the connector 33 is provided at the front edge (in the Z-axis positive direction shown in FIG. 3) of the gyro-sensor unit 7. A hook (not shown) is provided on each side of the plug 53. When the gyro-sensor unit 7 is mounted on the controller 5, the plug 53 is connected to the connector 33 and the hooks are engaged in the latch holes 33a of the controller 5, respectively. Thus, the gyro-sensor unit 7 is firmly fixed to the controller 5. The gyro-sensor unit 7 has buttons 51 on side surfaces thereof (surfaces in the X-axis direction shown in FIG. 3). When pressed, the buttons 51 release the engagement between the hooks and the latch holes 33a. Therefore, by pulling the plug 53 out of the connector 33 while pressing the buttons 51, it is possible to dismount the gyro-sensor unit 7 from the controller 5.

At the rear end of the gyro-sensor unit 7, a connector having the same shape as the connector 33 is provided. Accordingly, another apparatus which can be mounted onto (the connector 33 of) the controller 5 can also be mounted onto the connector provided in the gyro-sensor unit 7. As shown in FIG. 3, a cover 52 is detachably mounted to the connector.

Note that the shapes of the controller 5 and the gyro-sensor unit 7, the shapes of the operation buttons, the number and the positions of the acceleration sensor and vibrator shown in FIG. 3 through FIG. 6 are merely examples, and any other shapes, numbers, and positions may be used to realize the present invention. In the present embodiment, the imaging direction used for the imaging means is the Z-axis positive direction. However, any direction may be used as an imaging direction. In other words, a position of the imaging information calculation section 35 (the light entrance surface 35a of the imaging information calculation section 35) of the controller 5 is not necessarily located at the front surface of the housing 31, and may be located at any other surface as long as light can be obtained from an outside of the housing 31.

Figure 7:
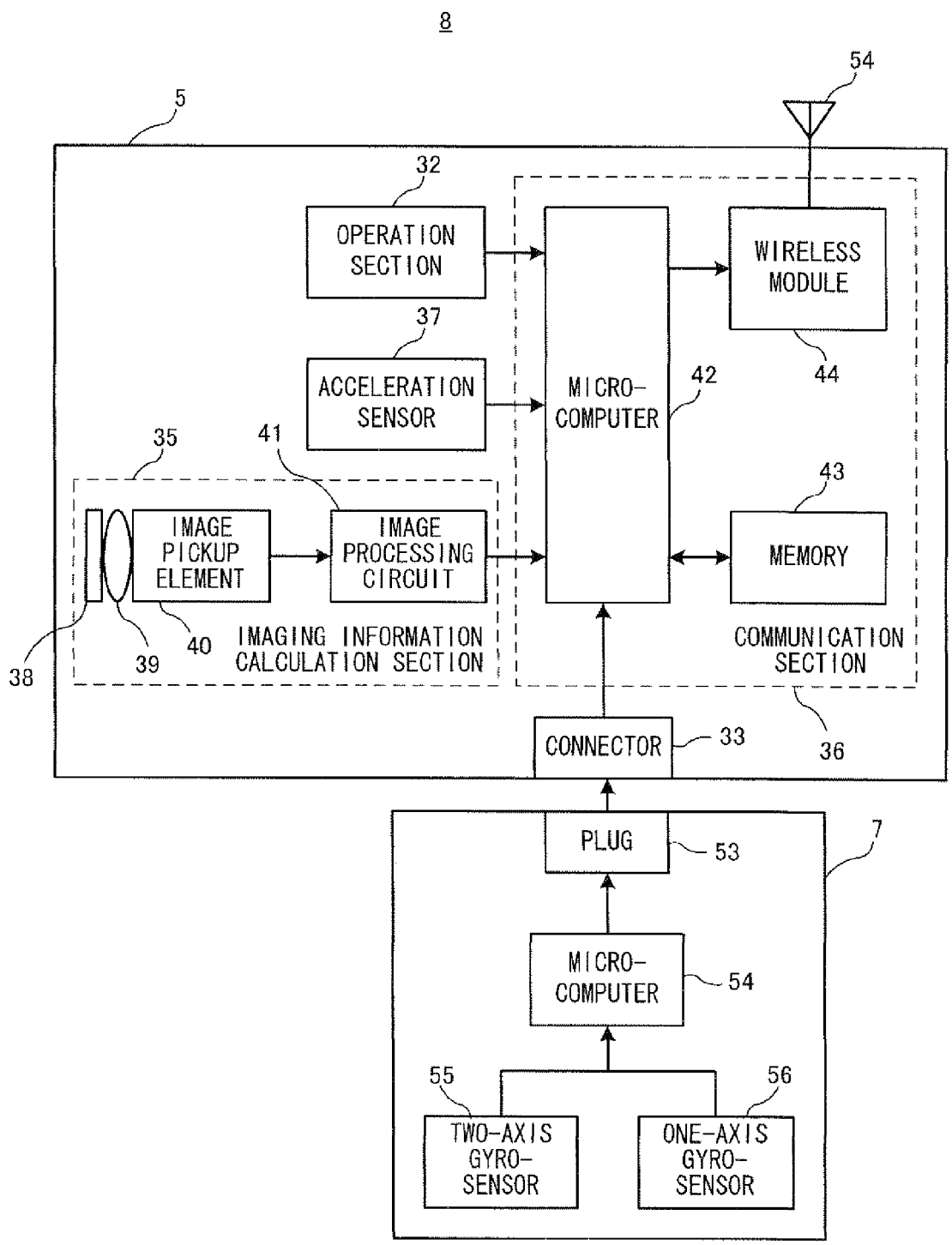
FIG. 7 is a block diagram illustrating a structure of the input device 8.

FIG. 7 is a block diagram illustrating a structure of the input devices 8 (the controller 5 and the gyro-sensor unit 7). The controller 5 includes the operation section 32 (the operation buttons 32a to 32i), the connector 33, the imaging information calculation section 35, a communication section 36, and the acceleration sensor 37. The controller 5 transmits, to the game apparatus 3, data representing a content of an operation performed using the controller 5, as operation data.

The operation section 32 includes the operation buttons 32a to 32i described above, and outputs, to the microcomputer 42 of the communication section 36, operation button data representing an input state of each of the operation buttons 32a to 32i (whether or not the operation buttons 32a to 32i are pressed).

The imaging information calculation section 35 is a system for analyzing image data taken by imaging means and calculating the position of the center of gravity, the size, and the like of an area having a high brightness in the image data. The imaging information calculation section 35 has, for example, a maximum sampling period of about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 allows, among lights incident on the front surface of the controller 5, only an infrared light to pass therethrough. The lens 39 collects the infrared light which has passed through the infrared filter 38 and outputs the infrared light to the image pickup element 40. The image pickup element 40 is a solid-state image pickup device such as, for example, a CMOS sensor or a CCD sensor. The image pickup element 40 receives the infrared light collected by the lens 39 and outputs an image signal. Each of the markers 6R and 6L of the marker section 6 located in the vicinity of the display of the television 2 includes an infrared LED which outputs an infrared light forward from the television 2. Thus, by providing the infrared filer 38, the image pickup element 40 is able to receive only the infrared light which has passed through the infrared filter 38, so as to generate an image data. Accordingly, the image pickup element 40 is able to pick up a more precise image of the markers 6R and 6L. Hereinafter, the image picked up by the image pickup element 40 is referred to as a picked up image. Image data generated by the image pickup element 40 is processed by the image processing circuit 41. The image processing circuit 41 calculates a position of a imaging target (markers 6R and 6L) in a picked up image. The image processing circuit 41 outputs coordinates representing the calculated position to the microcomputer 42 in the communication section 36. The data of the coordinates is transmitted, as operation data, to the game apparatus 3 by the microcomputer 42. Hereinafter, the coordinates as described above are referred to as "a marker coordinate point." Since the marker coordinate point will change in accordance with the orientation (inclination angle) and the position of the controller 5, the game apparatus 3 is allowed to calculate the orientation and the position of the controller 5 by using the marker coordinate point.

In another embodiment, the controller 5 may not necessarily include the image processing circuit 41, and thus a picked up mage may be transmitted as it is from the controller 5 to the game apparatus 3. In such a case, the game apparatus 3 may have a circuit or a program which has a function similar to that of the image processing circuit 41, so as to calculate the marker coordinate point.

The acceleration sensor 37 detects acceleration (including gravitational acceleration) of the controller 5, that is, the force (including the gravity) applied to the controller 5. The acceleration sensor 37 detects a value of acceleration component in a straight line direction (linear acceleration) along the sensing axis of the acceleration applied to the detection section of the acceleration sensor 37. For example, a multi-axis acceleration sensor, which is capable of detecting acceleration in directions along two or more axes, detects components of the acceleration along the axes, respectively, as the acceleration applied to the detection section of the acceleration sensor. For example, the two-axis or three-axis acceleration sensor may be of the type available from Analog Devices, Inc. or STMicroelectronics N.V. For example, the acceleration sensor 37 may be of the electrostatic capacitance type. However, other types of acceleration sensor may be used.

In the present embodiment, the acceleration sensor 37 detects linear acceleration in three directions, i.e. an up-down direction (the Y-axis direction shown in FIG. 3), a left-right direction (the X-axis direction shown in FIG. 3), and a front-rear direction (the Z-axis a direction shown in FIG. 3) with respect to the controller 5. Since the acceleration sensor 37 detects the acceleration in the straight line directions along the axes, an output from the acceleration sensor 37 represents values of linear acceleration in the directions along the three axes, respectively. In other words, the detected acceleration is represented by a three-dimensional vector in an XYZ coordinate system (controller coordinate system) defined with respect to the input device 8 (controller 5). Hereinafter, a vector having components representing acceleration values in the directions along the three axes, detected by the acceleration sensor 37, is referred to as an acceleration vector.

Data representing the acceleration (acceleration data) detected by the acceleration sensor 37 is outputted to the communication section 36. Since acceleration detected by the acceleration sensor 37 varies in accordance with an orientation (inclination angle) and a motion of the controller 5, the game apparatus 3 is able to calculate the orientation and the motion of the controller 5 by using the acceleration data. In the present embodiment, the game apparatus 3 determines the attitude of the controller 5 based on the acceleration data.

The data (acceleration data) representing the acceleration (acceleration vector) detected by the acceleration sensor 37 is outputted to the communication section 36. In the present embodiment, the acceleration sensor 37 is used as a sensor for outputting data for determining the inclination angle of the controller 5.

Note that, through processing performed by a computer such as a processor of a game apparatus 3 (e.g. the CPU 10) or a processor of the controllers (e.g. the microcomputer 42) based on the acceleration signals outputted from the acceleration sensor 37, additional information relating to the controller 5 can be inferred or calculated (determined), as one skilled in the art will readily understand from the description herein. For example, when the processing is performed by the computer on the assumption that the controller 5 provided with the acceleration sensor 37 is in a static state (i.e., when the processing is performed while acceleration detected by the acceleration sensor is only the gravitational acceleration), if the controller 5 is actually in a static state, the detected acceleration is used to determine whether or not the controller 5 is inclined relative to the direction of gravity or to what degree the controller 5 is inclined relative to the direction of gravity. More specifically, when a state where a detection axis of the acceleration sensor 37 extends in a vertically-down direction is set as a standard, it is possible to determine whether or not the controller 5 is inclined relative to the standard, by determining whether or not 1G (the gravitational acceleration) is applied, and it is also possible to determine to what degree the controller 5 is inclined relative to the standard direction, by determining the magnitude of the detected acceleration. In addition, in a case of a multi-axis acceleration sensor 37, it is possible to determine in detail to what degree the controller 5 is inclined relative to the direction of gravity through processing of a signal representing acceleration detected along each axis. In this case, the processor may calculate an inclination angle of the controller 5 based on the output from the acceleration sensor 37, or alternatively, may calculate a direction of inclination of the controller 5 without calculating the inclination angle. As described above, the acceleration sensor 37 may be used in combination with the processor to determine an inclination angle or attitude of the controller 5.

On the other hand, on the assumption that the controller 5 is in a dynamic state (the controller 5 is being moved), the acceleration sensor 37 detects acceleration corresponding to a motion of the controller 5 in addition to the gravitational acceleration. Thus, it is possible to determine a direction of the motion of the controller 5 by eliminating from the detected acceleration the gravitational acceleration component through predetermined processing. It is noted that even on the assumption that the controller 5 is in a dynamic state, it is possible to determine an inclination of the controller 5 relative to the direction of gravity by eliminating from the detected acceleration an acceleration component corresponding to a motion of the acceleration sensor through predetermined processing. In an alternative embodiment, the acceleration sensor 37 may include an embedded processor or another type of dedicated processor for performing predetermined processing of the acceleration signal detected by the acceleration detection means therein prior to outputting the signal to the microcomputer 42. For example, the embedded or dedicated processor may convert the acceleration signal into a corresponding inclination angle (or into other preferred parameters) in a case where the acceleration sensor 37 is used to detect static acceleration (e.g., the gravitational acceleration).

The communication section 36 includes the microcomputer 42, a memory 43, the wireless module 44, and the antenna 45. The microcomputer 42 controls the wireless module 44 for wirelessly transmitting the data acquired by the microcomputer 42 to the game apparatus 3 while using the memory 43 as a storage area during the processing. The microcomputer 42 is connected to the connector 33. The data transmitted from the gyro-sensor unit 7 is inputted into the microcomputer 42 via the connector 33. Hereinafter, the structure of the gyro-sensor unit 7 is described.

The gyro-sensor unit 7 includes the plug 53, a microcomputer 54, a two-axis gyro-sensor 55, and a one-axis gyro-sensor 56. As described above, the gyro-sensor unit 7 detects angular velocities about the three axes (XYZ axes in the present embodiment), respectively, and transmits the data (angular velocity data) representing the detected angular velocities to the controller 5.

The two-axis gyro-sensor 55 detects an angular velocity (per unit time) about an X-axis and an angular velocity (per unit time) about a Y-axis. The one-axis gyro-sensor 56 detects an angular velocity (per unit time) about a Z-axis. Hereinafter, relative to the imaging direction (Z-axis positive direction) of the controller 5, a rotation direction about the X axis is referred to as a roll direction; a rotation about the Y axis, a pitch direction; and a rotation direction about the Z axis, a yaw direction in other words, the two-axis gyro-sensor 55 detects an angular velocity in the roll direction (rotation direction about the X-axis) and an angular velocity in the pitch direction (rotation direction about the Y-axis), and the one-axis gyro-sensor 56 detects an angular velocity in the yaw direction (rotation direction about the Z-axis).

In the present embodiment, the two-axis gyro-sensor 55 and the one-axis gyro-sensor 56 are used so as to detect the angular velocities about three axes. In other embodiments, however, any number and any combination of gyro-sensors may be used as long as angular velocities about three axes are detected.

In the present embodiment, in order to provide easier calculation in attitude calculation processing described below, the three axes about which angular velocities are detected by the gyro-sensors 55 and 56 are set to correspond to the three axes (XYZ axes) about which acceleration is detected by the acceleration sensor 37. In other embodiments, however, the three axes about which angular velocities are detected by the gyro-sensors 55 and 56 may not necessarily correspond to the three axes about which acceleration is detected by the acceleration sensor 37.

The data representing the angular velocities detected by the gyro-sensors 55 and 56 is outputted to the microcomputer 54. Accordingly, into the microcomputer 54, the data representing the angular velocities about the three XYZ axes is inputted. The microcomputer 54 transmits via the plug 53 to the controller 5 the data representing the angular velocities about the three axes, as angular velocity data. The transmission from the microcomputer 54 to the controller 5 is performed at predetermined time intervals. Since a game processing is generally performed at a cycle of 1/60 sec. (as one frame time), the transmission is preferably performed at a cycle of a shorter time period than the period described above.

With reference back to the controller 5, the data outputted to the microcomputer 42 from the operation section 32, from the imaging information calculation section 35, and from the acceleration sensor 37, and the data transmitted to the microcomputer 42 from the gyro-sensor unit 7 are temporarily stored in the memory 43. The pieces of data are transmitted to the game apparatus 3 as the operation data. That is, at a timing of performing a transmission to the wireless controller module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency and to radiate the resultant weak radio signal from the antenna 45. In other words, the operation data is modulated into a weak radio signal by the wireless module 44 to be transmitted from the controller 5. The weak radio signal is received by the wireless controller module 19 at the game apparatus 3. The game apparatus 3 demodulates or decodes the weak radio signal to acquire the operation data. The CPU 10 of the game apparatus 3 performs the game processing in accordance with the acquired operation data and the game program. The wireless transmission from the communication section 36 to the wireless controller module 19 is performed at predetermined time intervals. Since game processing is generally performed at a cycle of 1/60 sec. (as one frame time), the transmission is preferably performed at a cycle of a shorter time period than the period described above. The communication section 36 of the controller 5 outputs the operation data to the wireless controller module 19 of the game apparatus 3, for example, once every 1/200 sec.

By using the controller 5, the player can perform operations of tilting the controller 5 at any inclination angle, in addition to conventional general game operations such as pressing the operation buttons. Further, by using the controller 5, the player can also perform an operation of pointing any position on a screen and an operation of moving the controller 5.

(First Embodiment)

Now, an outline of a game assumed in a first embodiment will be described. In the present embodiment, it is assumed that a sword game and the like in which a player swings swords is played. The player performs an operation of swinging the input device 8 including the gyro-sensor unit 7 as if the input device 8 were a sword. In accordance with the operation, a player object holding a sword object in a virtual game space performs an action of swinging the sword object. In this game, a "target" to be cut is displayed on a screen, and an instruction to cut the target is shown to the player. The player swings the input device 8 (the sword object in the virtual game space), aiming at the target. If the player successfully cuts the target in a time limit, a score is added. (Note that, the present invention is applicable to a game in which a plurality of target candidates are displayed on the screen, and the player locks on an object as a target through a predetermined operation.)

Figure 8:
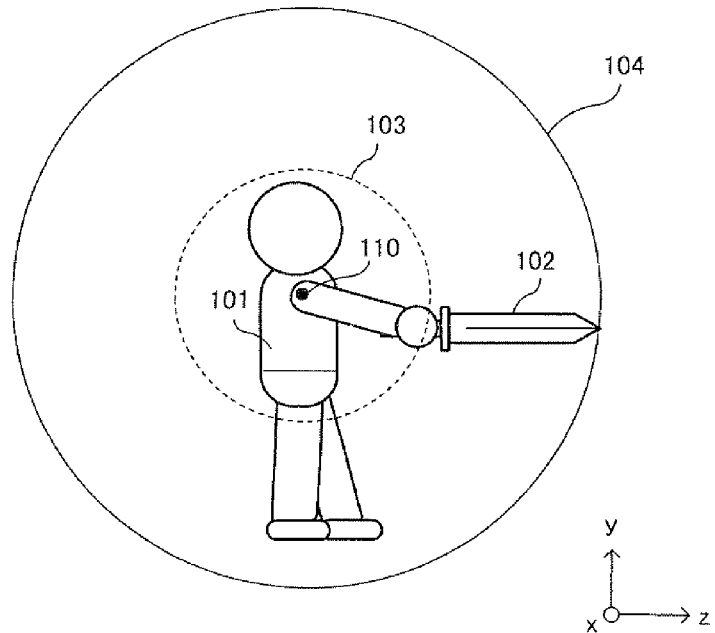
FIG. 8 is a diagram illustrating a movement of a sword object according to the present embodiment.

Here, a moving path of the sword object is described. In this game, a player object 101 has a sword object 102 in the right hand in a virtual game space, as shown in FIG. 8. Accordingly, with respect to the moving path of the sword object 102, a handle of the sword (a portion of the hand holding the sword) is moved on a surface of a sphere 103 (a sphere having a radius of the length of an arm of the player object 101) (represented by a circle in FIG. 8 as shown in two dimensions) in FIG. 8. The tip of the sword object 102 is moved on a surface of a virtual sphere having a central point thereof (point 110 shown in FIG. 8) at an shoulder of the player object 101 (a sphere having a radius of the length of the arm of the player object 101 plus the length of the sword object 102). Accordingly, the moving path of the sword object 102 in the present embodiment has a spherical shape having a certain point as a central point. Note that the sphere corresponds to a movable range of the right arm of the player object 101. The movable range may be appropriately set in accordance with the content of the game. Accordingly, the movable range, although represented by a circle in FIG. 8, may be an elliptic sphere. In any case, the moving path of the sword object 102 in the present embodiment will have a spherical shape having a certain point (point 110 shown in FIG. 8) as a central point.

Next, an outline of the processing according to the present embodiment will be described. As described above, the game is played by swinging, as a sword, the input device 8 including the gyro-sensor unit 7. Such a swinging operation using the gyro-sensor unit 7 requires a three-dimensional analog operation. In the present embodiment, an attitude of the input device 8 is calculated based on output data (angular velocity data) from the gyro-sensor unit 7. However, there tends to be a difference between the attitude calculated based on the data from the gyro-sensor unit 7 and the actual attitude of the input device 8. This makes it difficult for the player to cut an intended position, resulting in a higher difficulty of the game than needed. This may spoil the entertaining feature of the game. On the other hand, in this game, a "target" is shown as an object to be cut, as described above. In other words, the position which the player is aiming at is known in advance. Therefore, in this game, the path of the sword object 102 is corrected in such a manner that the sword object 102 is moved toward the target, thereby lowering the difficulty of the game, thus enhancing the easiness of the game as well as the entertaining feature of the game.

Figure 9:
FIG. 9 is a diagram schematically illustrating a movement of a sword object and correction processing thereof according to the present embodiment.
Figure 10:
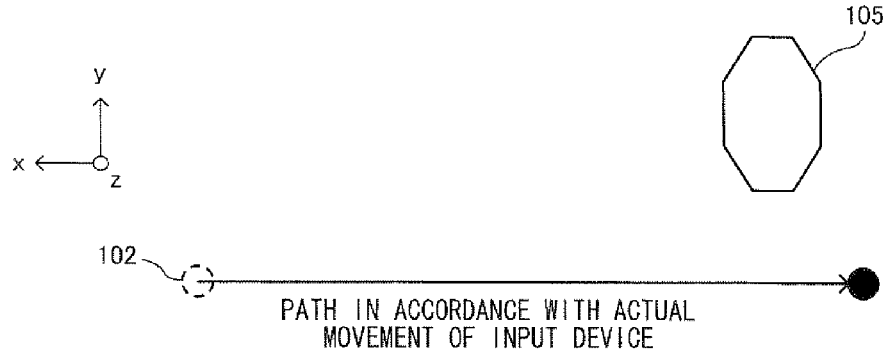
FIG. 10 is a diagram schematically illustrating a movement of a sword object and correction processing thereof according to the present embodiment.

Here, when such a correction is performed, a correction in which the position of the sword object 102 is simply brought close to the target may result in an unnatural motion. For example, the target 105 and the sword object 102 have a positional relationship as shown in FIG. 9 (in FIG. 9, the position of the sword object 102 is represented by a point). Now, the player horizontally moves the input device 8 to right (that is, the sword is swung horizontally to right). In this case, without a correction, the path of the sword object 102 will be made horizontally to right in the virtual space, as shown in FIG. 10. As a result, the sword object 102 fails to hit the target 105, and thus fails to cut the target 105.

Figure 11:
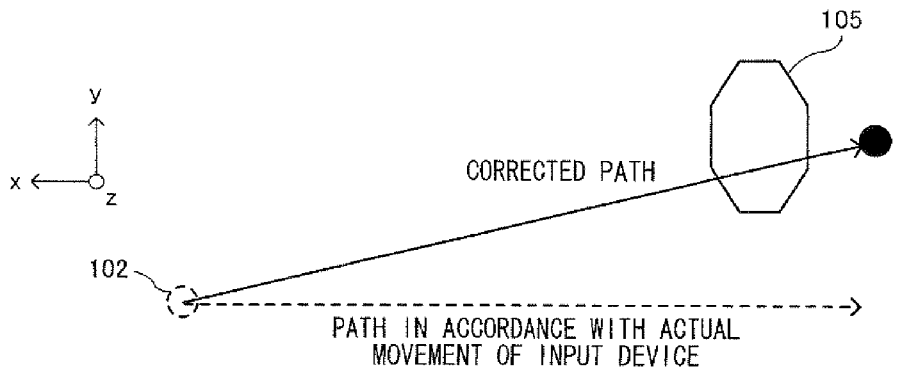
FIG. 11 is a diagram schematically illustrating a movement of a sword object and correction processing thereof according to the present embodiment.
Figure 12:
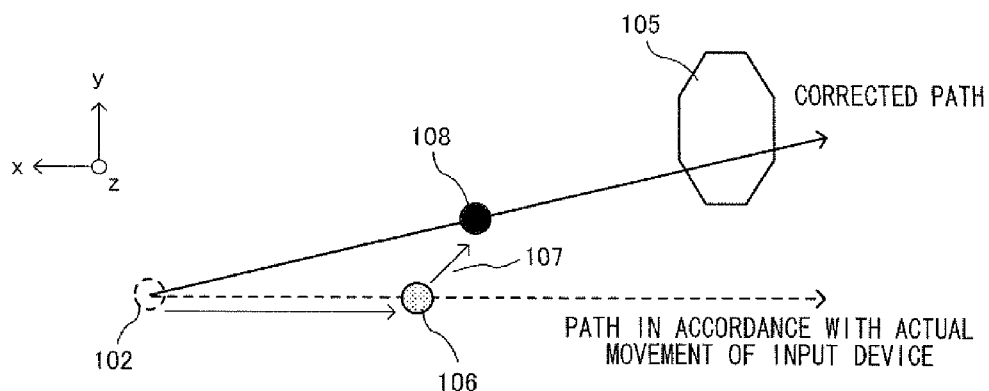
FIG. 12 is a diagram schematically illustrating a movement of a sword object and correction processing thereof according to the present embodiment.

Therefore, there considered is a correction which allows the moving path of the sword object 102 to hit the target 105, as shown in, for example, FIG. 11. An approach for such a correction is described below. First, as shown in FIG. 12, the sword object 102 is hypothetically moved in a direction in accordance with the actual motion of the input device 8, and then the resultant position (position of point 106 in FIG. 12) of the sword object 102 is calculated. Then the resultant position is corrected toward the target 105. At this time, a correction to simply bring the position of the sword object 102 close to the target 105 would cause the resultant position 106 to move to upper right (to the position of the point 108 shown in FIG. 12) as shown by the arrow 107 in FIG. 12. However, with such a correction, when the sword object 102 is brought close to the target 105, the player may have an impression that the sword object is moving increasingly quicker (for example, an impression that an unnatural acceleration is being applied, or the sword object 102 is being pulled toward the target 105). When the sword is moved away from the target 105, the player may have an impression that the sword is moving increasingly slower (an impression that the sword object 102 is being pulled by the target 105, and thus the sword is moving increasingly slower), and the player may notice that the correction is being performed.

Figure 13:
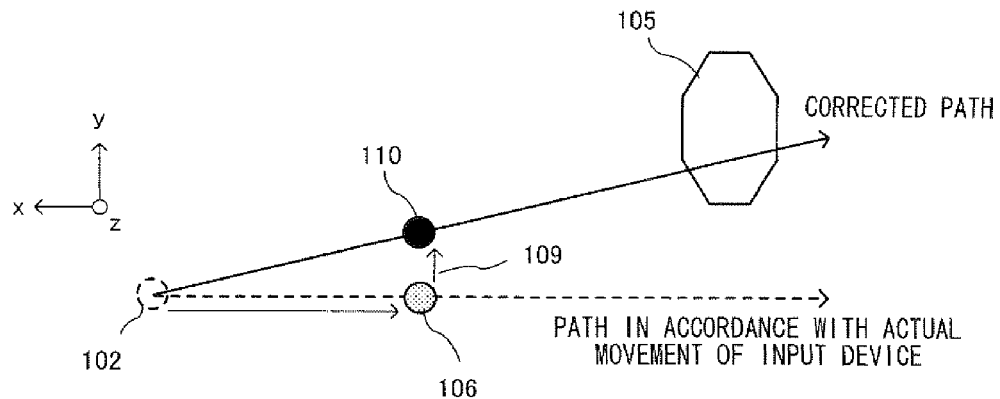
FIG. 13 is a diagram schematically illustrating a movement of a sword object and correction processing thereof according to the present embodiment.

Therefore, in the present embodiment, a correction is performed in a manner described below so that the player may see a natural motion of the sword object 102 without noticing that the correction is being performed. That is, the sword object 102 is once hypothetically moved in accordance with the motion of the input device 8, and then a correction is performed only in a direction other than the moving direction (right in FIG. 12) of the sword object 102 obtained from the input device 8. Specifically, a normal line of a plane defined based on the moving path of the sword object 102 is calculated, and then a correction is performed only in the direction of the normal line (that is, a direction perpendicular to the moving direction of the sword object 102). With reference to the figure above, since the sword is horizontally swung to right, the moving direction of the input device 8 (and the moving direction of the sword object 102 based thereon) is right, and thus the direction of the normal line of the plane defined based on the moving path is straight upward. Accordingly, in the correction to be performed, the position of the sword object 102 which has been hypothetically moved in accordance with the actual motion of the input device 8 is calculated first, and then the resultant position of the sword object 102 is further moved only in a straight upward direction (an arrow 109 shown in FIG. 13) (to the position of the point 110 shown in FIG. 13) as shown in FIG. 13, not in the upper right direction as shown in FIG. 12.

Furthermore, in the present embodiment, the magnitude of the correction described above (corresponds to the length of the arrow 109 shown in FIG. 13) is changed in accordance with a rotation speed (angular velocity) obtained from the gyro-sensor unit 7. This utilizes a characteristic that although a correction performed during a slow movement of the input device 8 by a player is easy to be noticed by the player, a correction performed during a fast movement of the input device 8 by the player is difficult to be noticed by the player.

Thus, the correction described above realizes a pseudo natural motion, thereby preventing the player from noticing the correction being performed. This allows the player to play the game easily without having an unnatural feeling.

Figure 14:
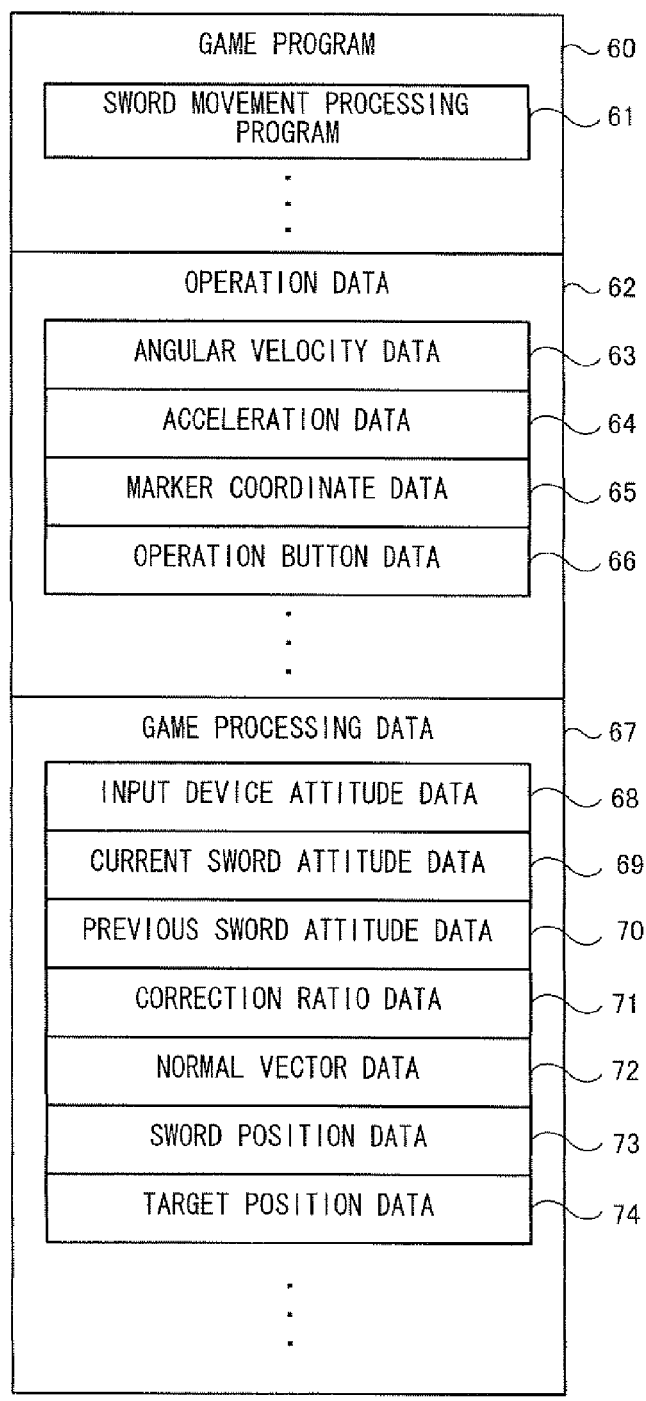
FIG. 14 is a diagram illustrating a memory map of an external main memory 12.

Next, the game processing executed by the game apparatus 3 will be described in detail. Initially, data which is stored in the external main memory 12 in the game processing will be described. FIG. 14 is a diagram illustrating a memory map of the external main memory 12 of the game apparatus 3. In FIG. 14, the external main memory 12 includes a game program 60, operation data 62, and game processing data 67. The game program 60 is stored in the optical disc 4 and transmitted to the external main memory 12 to be stored therein when the game program is executed.

The game program 60 stores a game program executed by the CPU 10, and the game program 60 includes a sword movement processing program 61.

The operation data 62 is operation data which is transmitted to the game apparatus 3 from the controller 5. As described above, since the operation data is transmitted once every 1/200 sec. to the game apparatus 3 from the controller 5, the operation data 62 stored in the external main memory 12 is updated at this rate. In the present embodiment, only the latest operation data (most recently acquired) may be stored in the external main memory 12.

The operation data 62 includes an angular velocity data 63, acceleration data 64, marker coordinate data 65, and operation button data 66. The angular velocity data 63 is data representing angular velocities detected by the gyro-sensors 55 and 56 in the gyro-sensor unit 7. Here, the angular velocity data 63 represents angular velocities about the three XYZ axes shown in FIG. 3, respectively. The acceleration data 64 is data representing acceleration (acceleration vector) detected by the acceleration sensor 37. Here, the acceleration data 64 represents a three-dimensional acceleration vector containing acceleration components along the three XYZ axes shown in FIG. 3. Moreover, in the present embodiment, the magnitude of an acceleration vector detected by the acceleration sensor 37 when the controller 5 is stationary is set to "1". In other words, the magnitude of the gravitational acceleration detected by the acceleration sensor 37 is "1."

The marker coordinate data 65 is data representing a coordinate point, that is, the marker coordinate point above described, calculated by the image processing circuit 41 in the imaging information calculation section 35. The marker coordinate point is represented in a two-dimensional coordinate system for representing a position on a plane corresponding to a picked up image. In a case where an image of the two markers 6R and 6L therein is picked up by the image pickup element 40, two marker coordinate points are calculated. Meanwhile, in a case where one of the markers 6R and 6L is not located within the area in which an image is picked up by the image pickup element 40, an image of only one marker present in the area is picked up by the image pickup element 40, and thus only one marker coordinate point is calculated. Further, in a case where neither of the markers 6R and 6L are located within the area in which an image is picked up by the image pickup element 40, no image of the markers is picked up by the image pickup element 40, and thus no marker coordinate point is calculated. Accordingly, the marker coordinate data 65 may represent two marker coordinate points, one marker coordinate point, or no marker coordinate point.

The operation button data 66 is data representing the input state of each of the operation buttons 32a to 32i.

The game processing data 67 is various data used in game processing, and includes input device attitude data 68, current sword attitude data 69, previous sword attitude data 70, correction ratio data 71, normal vector data 72, sword position data 73, and target position data 74.

The input device attitude data 68 is data representing an attitude of the input device 8. Hereinafter, the attitude of the input device 8 is referred to as a device attitude "Gdir". In the present embodiment, the device attitude Gdir is represented by a combination of three axes perpendicular to each other. That is, the device attitude Gdir is represented by using the XYZ axes of the controller coordinate system described above. Hereinafter, the X-axis in the controller coordinate system is represented as "Gdir.X"; the Y-axis, "Gdir.Y"; and the Z-axis, "Gdir.Z." As to components in the respective axes, the X-axis, for example, is represented as (Gdir.X.x, Gdir.X.y, Gdir.X.z). To be more specific, the input device attitude data 68 is data corresponding to a matrix described below.

$$\begin{bmatrix} Gdir\cdot X\cdot x & Gdir\cdot X\cdot y & Gdir\cdot X\cdot z \\ Gdir\cdot Y\cdot x & Gdir\cdot Y\cdot y & Gdir\cdot Y\cdot z \\ Gdir\cdot Z\cdot x & Gdir\cdot Z\cdot y & Gdir\cdot Z\cdot z \end{bmatrix}$$

The current sword attitude data 69 is data representing the attitude of the sword object 102. Hereinafter, the attitude of the sword object represented by the current sword attitude data 69 is referred to as a current sword attitude "Sdir". Moreover, in the present embodiment, it is assumed that the current sword attitude data 69 is equivalent to the input device attitude data 68. That is, the device attitude Gdir is used as it is as the current sword attitude Sdir. Accordingly, the current sword attitude data Sdir can also be represented by using a 3×3 matrix as shown below, as in the case of the input device attitude data Gdir described above.

$$\begin{bmatrix} Sdir\cdot X\cdot x & Sdir\cdot X\cdot y & Sdir\cdot X\cdot z \\ Sdir\cdot Y\cdot x & Sdir\cdot Y\cdot y & Sdir\cdot Y\cdot z \\ Sdir\cdot Z\cdot x & Sdir\cdot Z\cdot y & Sdir\cdot Z\cdot z \end{bmatrix}$$

The previous sword attitude data 70 is the current sword attitude data that is most recently calculated and saved. Since processing described below is repeatedly performed per frame, the current sword attitude data 69 calculated in the most recent frame is indicated as the previous sword attitude data 70. Hereinafter, the attitude of the sword object represented by the previous sword attitude data 70 is referred to as a previous sword attitude "PrevSdir". The previous sword attitude data 70 can also be represented by using a 3×3 matrix as shown below, as in the case of the input device attitude data Gdir described above.

$$\begin{bmatrix} PrevSdir\cdot X\cdot x & PrevSdir\cdot X\cdot y & PrevSdir\cdot X\cdot z \\ PrevSdir\cdot Y\cdot x & PrevSdir\cdot Y\cdot y & PrevSdir\cdot Y\cdot z \\ PrevSdir\cdot Z\cdot x & PrevSdir\cdot Z\cdot y & PrevSdir\cdot Z\cdot z \end{bmatrix}$$

The correction ratio data 71 is a coefficient representing the magnitude of the correction described above. The normal vector data 72 is data representing the direction of a normal line relative to the plane defined based on the moving path of the sword as described above. The sword position data 73 is data representing the position of the sword object 102 in the virtual game space. The target position data 74 is data representing the position of the target 105 in the virtual space. Hereinafter, the correction ratio represented by the correction ratio data 71 is referred to as a "ratio"; the normal vector represented by the normal vector data 72, "nrm"; the position of the sword object 102, in the virtual space, represented by the sword position data 73, "Spos"; and the position of the target 105 in the virtual space represented by the target position data 74, "Tpos".

Figure 15:
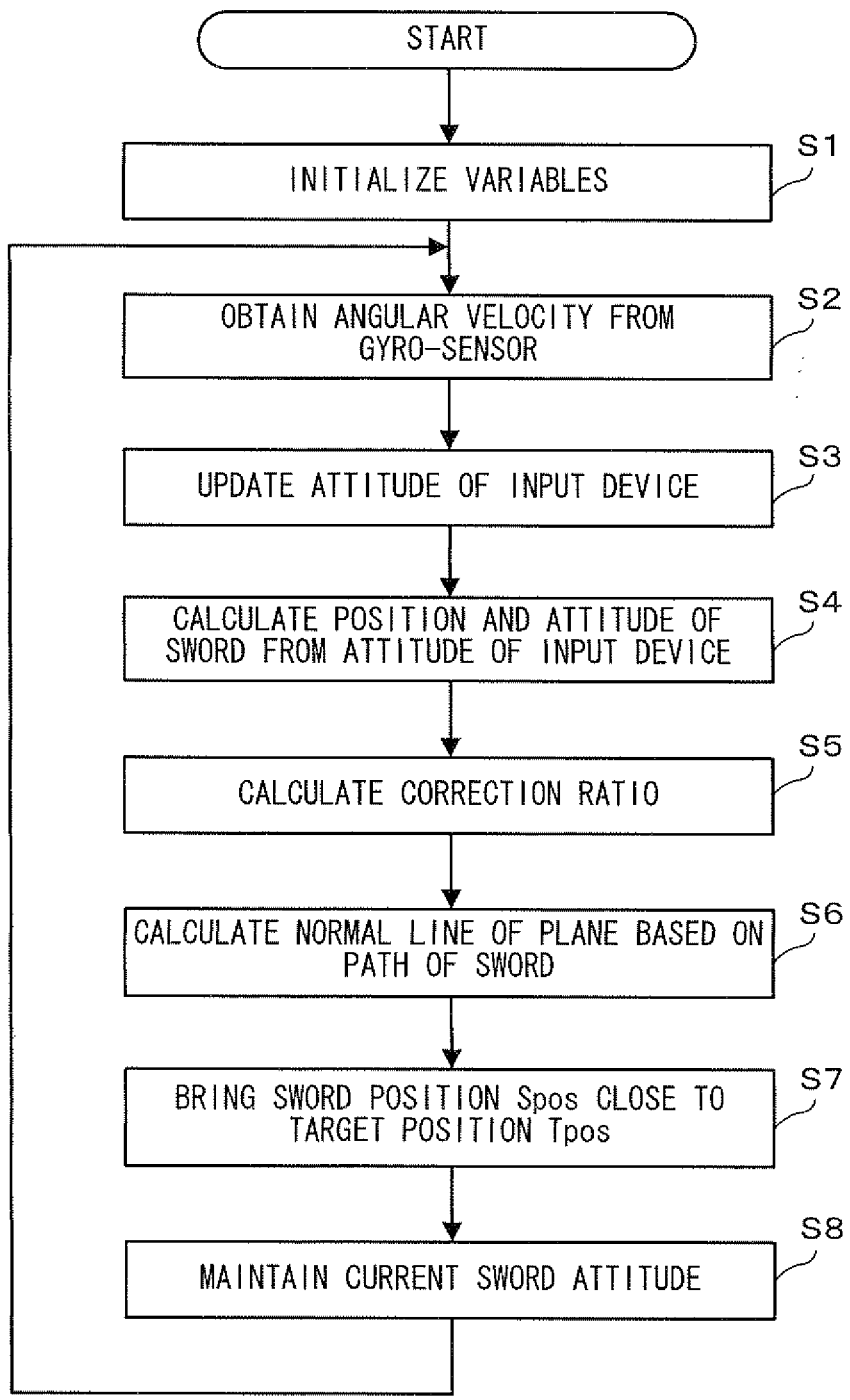
FIG. 15 is a flow chart showing processing according to a first embodiment.
Figure 16:
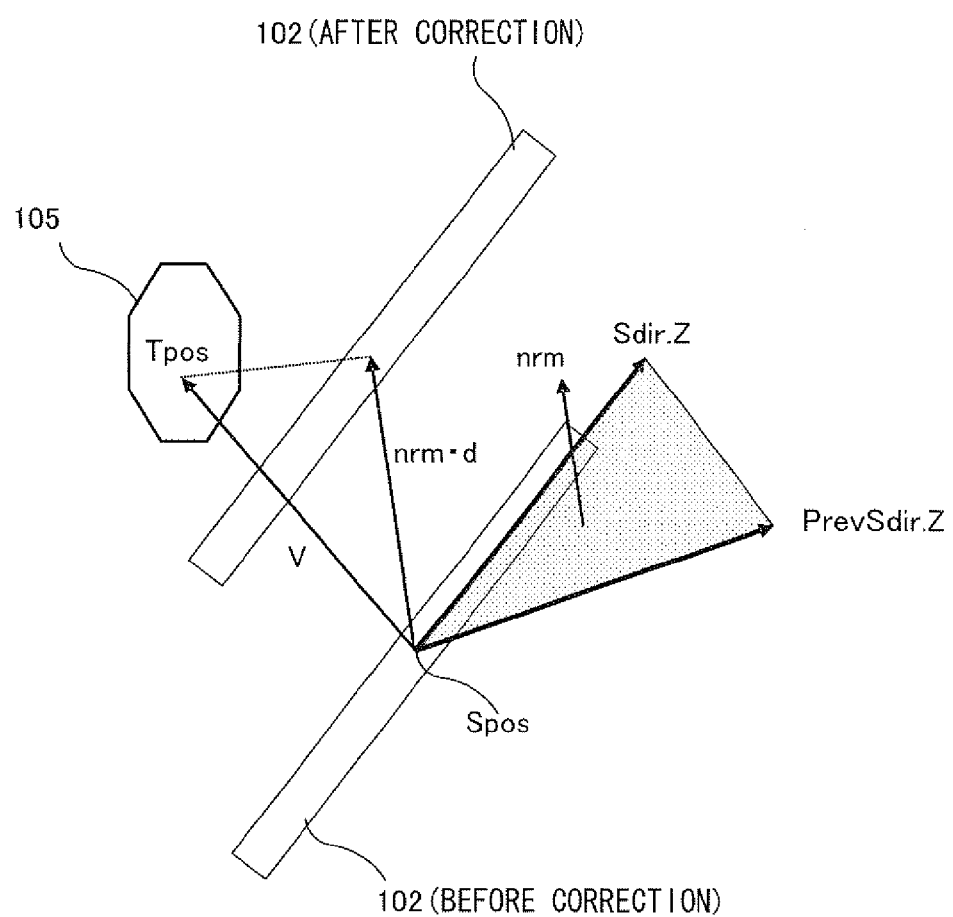
FIG. 16 is a diagram conceptually illustrating a movement of a sword object and correction thereof according to the first embodiment.

Next, with reference to FIG. 15 and FIG. 16, of the game processing performed by the game apparatus 3, sword object movement processing according to the present embodiment (hereinafter, referred to as sword movement processing) will be described. FIG. 15 is a flow chart showing in detail sword movement processing according to a first embodiment of the present invention. FIG. 16 is a diagram conceptually illustrating the correction processing of the position of the sword object 102. When the game apparatus 3 is turned on, the CPU 10 of the game apparatus 3 executes a boot program stored in the ROM/RTC 13, so as to initialize the respective units such as the external main memory 12. The game program stored in the optical disc 4 is loaded to the external main memory 12, and the CPU 10 starts to execute the game program. The flowchart shown in FIG. 15 shows sword movement processing to be performed after the processing described above is completed. Further, a process loop of steps S1 to S8 shown in FIG. 15 is repeated in each frame. In the present embodiment, game processing other than the sword movement processing is not directly relevant to the present invention, and thus description thereof is omitted.

In FIG. 15, first, in step S1, an initialization process of variables used in the subsequent processes is performed. Specifically, data corresponding to a matrix below is set as input device attitude data 68 (that is, device attitude Gdir). The same data is also set as previous sword attitude data 70.

$$\begin{bmatrix} 1 & 0 & 0 \\ 0 & 1 & 0 \\ 0 & 0 & 1 \end{bmatrix}$$

Next, in step S2, angular velocity data 63 is acquired from the external main memory 12.

Next, in step S3, the attitude of the input device 8 is updated in accordance with the angular velocity data 63 as acquired above. Specifically, first, angular velocity components along three axes represented by the angular velocity data 63 are combined together so as to calculate a three-dimensional vector omega. Next, a rotation matrix is generated so as to rotate, about the three-dimensional vector omega, the device attitude Gdir, only by the amount of the absolute value of the angle represented by the omega. Next, the device attitude Gdir is converted by using the resultant rotation matrix (that is, the device attitude Gdir is rotated) so as to calculate the current attitude of the input device 8. Then, the device attitude Gdir is updated in accordance with the calculated attitude.

Next, in step S4, the position and the attitude of the sword object 102 are calculated in accordance with the calculated device attitude Gdir. As mentioned above, the device attitude Gdir is used as it is as the attitude Sdir of the sword object 102. Accordingly, the values of the input device attitude data 68 are set as the current sword attitude data 69 (that is, the moving direction of the input device 8 serves as the moving direction of the sword object 102). On the other hand, the position Spas of the sword object 102 is calculated, for example, as described below. First, a distance S from the position of a shoulder of the player object to the position of the sword object 102 (to be more specific, to the position of the tip of the sword object 102. Depending on a content of a game, the center of gravity of the sword object 102 may be used.) is calculated. Thus, the sword position Spos is calculated by using the following formula (that is, the position of the sword object 102 after the movement thereof is calculated, based only on the change of the attitude of the input device 8).

$$Spos=(\text{position of shoulder of player object})+(Gdir.Z)\times S$$

Next, in step S5, calculation of a correction ratio is performed. In the present embodiment, the correction ratio is proportional to the magnitude of the angular velocity. Specifically, the correction ratio is calculated by using the following formula:

$$\text{ratio}=(\text{absolute value of omega})\cdot K,$$

where K is a predetermined constant. In a case where the correction ratio calculated by using the formula is larger than "1", the value of the correction ratio is set to "1." That is, adjustment is made such that the maximum value of the ratio is "1." Thus, the correction ratio determined as described above is stored in the external main memory 12 as correction ratio data 71.

Next, in step S6, a normal vector nrm relative to the plane defined based on the moving path of the sword object 102 is calculated. Specifically, the previous sword attitude data 70 is read from the external main memory 12, and a vector product between a vector PrevSdir.Z representing the Z-axis direction of the previous sword attitude PrevSdir and a vector Sdir.Z representing the Z-axis direction of the current sword attitude Sdir calculated in step S4 is calculated. Then the normal vector nrm is calculated by normalizing the calculated value, so as to be stored as normal vector data 72 in the external main memory 12.

Next, in step S7, correction in which the sword position Spas is brought close to the target position Tpos is performed. The process is described in detail with reference to FIG. 16. First, sword position data 73 and target position data 74 are read from the external main memory 12. Then, a vector V from the position of the sword object 102 to the position of the target 105 is calculated by using the following formula:

$$V=\text{Tpos}-\text{Spas}.$$

Next, a length d representing the length of the normal vector nrm component of the components of the vector V is calculated by using the following formula:

$$d=(nrm.x)\cdot(V.x)+(nrm.y)\cdot(V.y)+(nrm.z)\cdot(V.z),$$

where (nrm.x) represents an X-axis component of the normal vector nrm, and (V.x) represents an X-axis component of the vector V. A Y-axis component and a Z-axis component are represented in the same manner. Then, a final sword position Spas is calculated by using the following formula, so as to be stored as sword position data 73 in the external main memory 12. In other words, the sword position Spas is moved in the direction of the normal vector nrm in accordance with the correction ratio.

$$Spos=Spos+nrm\cdot d\cdot\text{ratio}$$

Next, in step S8, the current sword attitude data 69 is stored as the previous sword attitude data 70 in the external main memory 12. Subsequently, returning to step S2, processing is repeated until predetermined game processing end conditions (not shown) are satisfied. This is the end of the sword object movement processing according to the first embodiment.

As described above, in performing the correction to bring the position of the sword object 102 close to the target, the present embodiment employs the correction performed only in the direction of the normal line relative to the plane defined based on the moving path of the sword object 102, instead of the correction to simply bring the position of the sword object 102 close to the target 105. This makes it difficult for the player to notice the correction being performed, while enabling the sword object 102 to hit the target 105 more easily. As a result, the difficulty level of the game can be lowered, which prevents a lowered motivation for the user.

(Second Embodiment)

Next, a second embodiment of the present invention will be described with reference to FIG. 17 to FIG. 18. In the first embodiment, correction is performed only in the direction of the normal vector nrm. In contrast, in the second embodiment, in order to further enhance the entertaining feature of a game, correction is performed in a direction slightly shifted toward a target from the direction of a normal vector nrm, to such an extent as to prevent an unnatural feeling to the player.

For example, several difficulty levels are provided in advance so that the player may set a difficulty level of the game. For example, difficulty levels are provided for selection from ten levels: 1 (easiest) to 10 (most difficult) (for example, a setting screen of the game is displayed such that the player may select the difficulty level). Then, a case at which correction is performed only in the normal vector nrm as described in the first embodiment is set as a difficulty level 10. Then, at a lower level of the difficulty, the position of the sword object 102 is increasingly corrected toward a direction shifted from the direction of the nrm toward the target 105, to such an extent as to prevent an unnatural feeling to the player.

Next, processing according to the second embodiment will be described with reference to FIG. 17 and FIG. 18. FIG. 17 is a flow chart showing in detail sword movement processing according to the second embodiment, and FIG. 18 is a diagram conceptually illustrating the processing of the present embodiment. In FIG. 17, processes from step S1 to step S6 and a process in step S8 are the same as those in step S1 to step S6 and that in step S8 described with reference to FIG. 15 in the first embodiment. Thus, detailed description thereof will be omitted.

Figure 17:
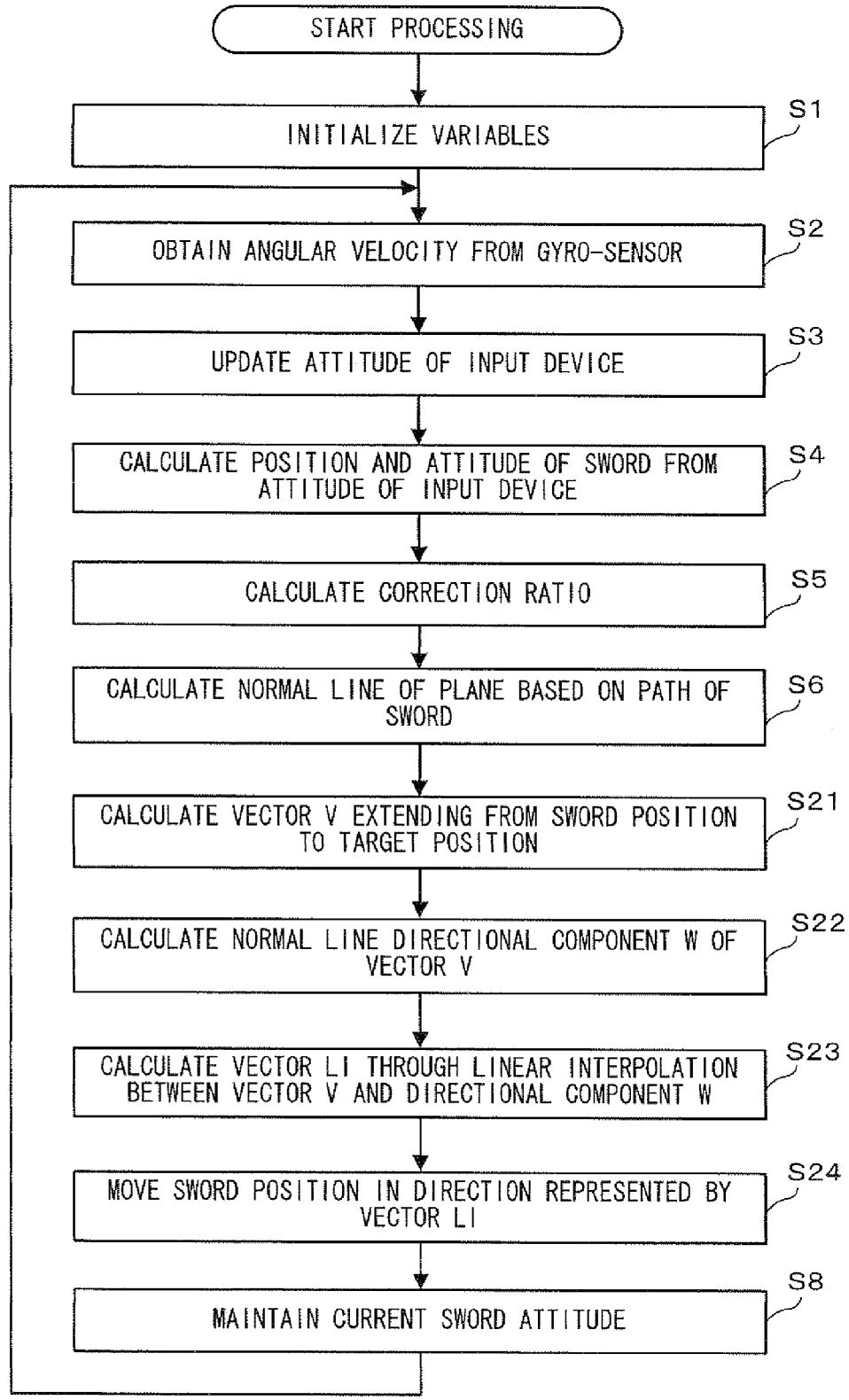
FIG. 17 is a flow chart showing processing according to a second embodiment.

In FIG. 17, upon completion of calculation of the normal vector nrm in step S6, then in step S21, a vector V extending from the position of the sword object 102 to the position of the target 105 is calculated by using the following formula:

$$V=\text{Tpos}-\text{Spas}.$$

Next, in step S22, of the components of the vector V, a directional component W of the normal vector nrm as shown in FIG. 18 is calculated by using the following formula:

$$d=(nrm.x)\cdot(V.x)+(nrm.y)\cdot(V.y)+(nrm.z)\cdot(V.z)$$

$$W=nrm\cdot d,$$

where d is the length of the normal vector nrm component described in the first embodiment.

Next, in step S23, a vector LI is obtained through linear interpolation between the vector V and the directional component W, by using the following formula:

$$LI=W\cdot k+V\cdot(1-k),$$

where the coefficient k is an adjustment coefficient ranging from 0.0 to 1.0. Then, the coefficient k is set to represent a difficulty level as described above. In an exemplary case of ten difficulty levels provided as described above, when the difficulty level 1 (easiest) is set, 0 is assigned to the coefficient k. This results in LI=V, and thus a vector toward the target 105 is calculated. Meanwhile, when the difficulty level 10 (the most difficult) is set, 1 is assigned to the coefficient k. This results in LI=W, and thus the vector LI, a vector only in the direction of the normal vector nrm as described in the first embodiment, is calculated. Furthermore, for the difficulty levels 1 to 10, the coefficients k are assigned such that the difference between any two successive coefficients k is, for example, 0.1.

Next, in step S24, the sword position Spos is corrected in the direction represented by the vector LI. Here, as in the first embodiment, the magnitude of correction to be performed is determined in accordance with the correction ratio. Specifically, the Spos is calculated by using the following formula:

$$Spos=Spos+LI\cdot ratio.$$

Subsequently, processes of step S8 and thereafter as described in the first embodiment are performed. This is the end of the sword movement processing according to the second embodiment.

As described above, according to the second embodiment, a slight change of the direction of the correction can be realized in accordance with the setting of the difficulty level of the game. In the example above, in a case where the difficulty level is set at 10, the position of the sword object 102 is corrected only in the direction of the normal vector nrm. However, in a case where the difficulty level is set at 1, correction is performed such that the position of the sword object 102 is brought toward a direction slightly shifted from the nrm direction toward the target 105, whereby a difficulty level of the game can be lowered. Thus, the entertaining feature of the game can be enhanced.

Note that, the gyro-sensor unit 7 is used in the examples in the embodiments described above. However, the correction ratio, for example, may be calculated based on the acceleration detected by the acceleration sensor 37. In such a case, the correction ratio may be in proportional to the magnitude of the detected acceleration.

Moreover, in the embodiments described above, correction processing is always performed irrespective of the magnitude of the motion of the input device 8. However, the correction described above may be performed only when the magnitude of the motion of the input device 8 is larger than a predetermined value. For example, whether or not the magnitude of the angular velocity obtained at step S2 is larger than a predetermined value is determined first. Then, only when the magnitude of the angular velocity is larger than the predetermined value, processes of step S3 and thereafter may be performed. The magnitude of the motion of the input device 8 may be determined based on the attitude of the input device calculated at step S3 instead of the magnitude of angular velocity. In other words, a difference between the current attitude of the input device 8 calculated at step S3 and the attitude of the input device 8 calculated in the immediately preceding frame may be calculated to determine whether or not the difference is greater than a predetermined value, so as to determine whether or not the magnitude of the motion of the input device is larger than a predetermined value. Accordingly, correction can be avoided when an amount of the motion of the input device 8 is small, which further prevents the player from noticing the correction being performed.

With regard to the detection of the attitude of the input device 8, detection performed by using the gyro-sensor unit 7 is used as an example in the embodiments described above. However, the present invention is not limited thereto. For calculation of the attitude of the input device 8, an image of the input device 8 may be taken by using a predetermined camera such that the attitude of the input device 8 is calculated based on the data of the taken image. For example, an image of the input device 8 is taken using a predetermined camera, and then the game apparatus 3 acquires data of the taken image. Then, the CPU 10 may execute operations of identifying the input device 8 in the taken image so as to calculate the attitude of the input device 8 and the moving direction thereof. Thus, based on the calculated moving direction, a direction perpendicular to the moving direction as described above may be calculated.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium storing an information processing program comprising instructions to be executed by a computer of an information processing apparatus for performing information processing causing an object in a virtual three-dimensional (3D) space to move, based on detected attitude information obtained from an attitude detector configured to detect a 3D attitude of an input device while a user moves the input device, the information processing program causing the computer to perform at least:
updating, based on the detected 3D attitude of the input device, a 3D attitude of the object in the virtual 3D space from a previous 3D attitude of the object in the 3D virtual space to an updated 3D attitude of the object in the 3D virtual space;
calculating a moving path in the 3D virtual space for the 3D object based on a difference between the previous 3D attitude of the object in the 3D virtual space and the updated 3D attitude of the object in the 3D virtual space; and
causing the object to move to a 3D position in the virtual space which is obtained by hypothetically moving the object along the moving path in the 3D virtual space calculated based on the difference between the previous 3D attitude of the object in the 3D virtual space and the updated 3D attitude of the object in the 3D virtual space and then by correcting the 3D position in the virtual space to which the object is hypothetically moved, only in a direction normal or substantially normal to a plane defined in 3D virtual space to contain the moving path in the 3D virtual space calculated based on the difference between the previous 3D attitude of the object in the 3D virtual space and the updated 3D attitude of the object in the 3D virtual space, thereby applying the correction only in a direction other than the moving path.

2. The computer-readable storage medium storing the information processing program according to claim 1, wherein the attitude detector comprises a gyrosensor included in the input device.

3. The computer-readable storage medium storing the information processing program according to claim 1, wherein the object moving causes the object to move such that the object is brought to or brought close to a predetermined targeted position.

4. The computer-readable storage medium storing an information processing program according to claim 1, wherein
the information processing program further causes the computer to repeatedly calculate, based on the attitude information, a sequence of input attitudes representing the changing attitude of the input device, and
the object moving causes the object to move to a position which is obtained by correcting the position of the object hypothetically moved, only in a direction normal or substantially normal to a plane defined based on the moving path, the direction being defined based on the sequence of input attitudes repeatedly calculated by the input attitude calculation.

5. The computer-readable storage medium storing an information processing program according to claim 4, wherein
the plane is defined based on a change of the input attitudes repeatedly calculated by the input attitude calculation.

6. The computer-readable storage medium storing an information processing program according to claim 4, wherein
the object moving causes the object to move to a position which is obtained by correcting the position of the object hypothetically moved, only in a direction defined by a vector product of vectors of two predetermined input attitudes among the input attitudes repeatedly calculated by the input attitude calculation.

7. The computer-readable storage medium storing an information processing program according to claim 6, wherein
the two predetermined input attitudes among the input attitudes repeatedly calculated by the input attitude calculation are input attitudes calculated in succession.

8. The computer-readable storage medium storing an information processing program according to claim 1, wherein
the information processing program further causes the computer to determine whether or not a magnitude of a motion of the input device is larger than a predetermined value, and
the object moving performs correction when the motion determination determines that the magnitude of the motion of the input device is larger than the predetermined value.

9. The computer-readable storage medium storing an information processing program according to claim 8, wherein
the object moving calculates correction direction data representing a direction normal or substantially normal to a plane defined based on the moving path, and
increases a magnitude of the correction to be performed in a direction represented by the correction direction data in accordance with an increase in the magnitude of the motion of the input device.

10. The computer-readable storage medium storing an information processing program according to claim 1, wherein
the object moving calculates correction direction data representing a direction normal or substantially normal to a plane defined based on the moving path, and
increases a magnitude of correction to be performed in a direction represented by the correction direction data in accordance with an increase in the magnitude of the motion of the input device.

11. The computer-readable storage medium storing an information processing program according to claim 1, wherein
the object moving calculates correction direction data and then by correcting the position of the object hypothetically moved, only in the direction represented by the correction direction data.

12. The computer-readable storage medium storing an information processing program according to claim 1, wherein
the attitude detector includes an angular velocity sensor, and
the motion information includes information containing an angular velocity detected by the angular velocity sensor.

13. The storage medium of claim 1 wherein the attitude detector comprises a gyrosensor that detects angular rate of change of input device attitude.

14. The storage medium of claim 1 wherein attitude Gdir is represented in three dimensions by $$\begin{bmatrix} Gdir.X.x & Gdir.X.y & Gdir.X.z \\ Gdir.Y.x & Gdir.Y.y & Gdir.Y.z \\ Gdir.Z.x & Gdir.Z.y & Gdir.Z.z \end{bmatrix}.$$

15. An information processing apparatus for performing information processing for causing an object in a virtual three-dimensional (3D) space to move, based on detected attitude obtained from predetermined detection for detecting a previous 3D attitude and an updated 3D attitude of an input device operated by a user, comprising:
a 3D attitude updater that updates, based on the detected 3D attitude of the input device, a 3D attitude of the object in the virtual 3D space from a previous 3D attitude of the object in the 3D virtual space to an updated 3D attitude of the object in the 3D virtual space;
a 3D moving direction calculator structured to calculate, based on a difference between the previous 3D attitude of the input device and the updated 3D attitude of the input device, a 3D moving direction representing a 3D moving path of the object in the virtual space; and
an object mover structured to cause the object to move to a 3D position in virtual space which is obtained by hypothetically moving the object along the 3D moving path in the virtual space calculated based on the difference between the previous 3D attitude of the object in the 3D virtual space and the updated 3D attitude of the object in the 3D virtual space and then by correcting the 3D position in the virtual space to which the object is hypothetically moved, only in a direction normal or substantially normal to a plane defined in 3D virtual space to contain the moving path in the 3D virtual space calculated based on the difference between the previous 3D attitude of the object in the 3D virtual space and the updated 3D attitude of the object in the 3D virtual space, thereby applying the correction only in a direction other than the moving path.

16. A method for causing an object in a virtual three-dimensional (3D) space to move, based on attitude information obtained from predetermined detection for detecting 3D attitudes of an input device operated by a user, comprising:
detecting plural 3D attitudes of the input device;
updating, based on the detected 3D attitudes of the input device, a 3D attitude of the object in the 3D virtual space from a previous 3D attitude of the object in the 3D virtual space to an updated 3D attitude of the object in the 3D virtual space;
calculating, based on changes between the detected plural attitudes of the input device including a difference between the previous 3D attitude of the object in the 3D virtual space and the updated 3D attitude of the object in the 3D virtual space, a 3D moving path in the 3D virtual space for the object to move in the 3D virtual space; and
causing the object to move to a 3D position in the virtual space which is obtained by hypothetically moving the object along the 3D moving path calculated based on the difference between the previous 3D attitude of the object in the 3D virtual space and the updated 3D attitude of the object in the 3D virtual space and then by correcting the 3D position in the virtual space to which the object is hypothetically moved, only in a direction normal or substantially normal to a plane defined in 3D virtual space to contain the 3D moving path in the 3D virtual space calculated based on the difference between the previous 3D attitude of the object in the 3D virtual space and the updated 3D attitude of the object in the 3D virtual space, thereby applying the correction only in a direction other than the calculated 3D moving path.

17. A system for causing an object in a virtual three-dimensional (3D) space to move, comprising:
    an input device operated by a user, the input device comprising a gyrosensor that senses the attitudes of the input device while the user moves the input device; and
    a processor operatively coupled to the input device that causes an object in a virtual 3D space to move based on changes in the sensed attitudes of the input device, the processor:
    updating, based on the sensed attitudes of the input device, a 3D attitude of the object in the 3D virtual space from a previous 3D attitude of the object in the 3D virtual space to an updated 3D attitude of the object in the 3D virtual space;
        calculating, based on the sensed attitude changes including a difference between the previous 3D attitude of the object in the 3D virtual space and the updated 3D attitude of the object in the 3D virtual space, a 3D moving path; and
    causing the object to move to a 3D position in the virtual space which is obtained by hypothetically moving the object along the 3D moving path in the 3D virtual space calculated based on the difference between the previous 3D attitude of the object in the 3D virtual space and the updated 3D attitude of the object in the 3D virtual space and then by correcting the 3D position in the virtual space to which the object is hypothetically moved, only in a direction normal or substantially normal to a plane defined in 3D space to contain the 3D moving path in the 3D virtual space calculated based on the difference between the previous 3D attitude of the object in the 3D virtual space and the updated 3D attitude of the object in the 3D virtual space, thereby applying the correction of the object only in a direction other than the 3D moving path.

* * * * *